(12) United States Patent
Takeda et al.

(10) Patent No.: US 6,445,671 B1
(45) Date of Patent: Sep. 3, 2002

(54) OPTICAL PICKUP DEVICE HAVING A SHIELDING PROTECTION

(75) Inventors: Tadashi Takeda; Hisahiro Ishihara; Yoshio Hayashi; Taminori Masuzawa; Yuichi Takei, all of Nagano (JP)

(73) Assignee: Kabushiki Kaisha Sankyo Seiki Seisakusho, Tokyo (JP)

( * ) Notice: Subject to any disclaimer, the term of this patent is extended or adjusted under 35 U.S.C. 154(b) by 0 days.

(21) Appl. No.: 09/343,267

(22) Filed: Jun. 30, 1999

(30) Foreign Application Priority Data

| Jun. 30, 1998 | (JP) | ......................................... | 10-183510 |
| Jun. 30, 1998 | (JP) | ......................................... | 10-183511 |
| Jun. 30, 1998 | (JP) | ......................................... | 10-183512 |

(51) Int. Cl.$^7$ .............................................. G11B 7/125
(52) U.S. Cl. ...................................... 369/121; 369/120
(58) Field of Search ...................... 369/44.12, 120–122; 257/90–82, 84, 433, 435

(56) References Cited

U.S. PATENT DOCUMENTS 4,564,757 A * 1/1986 LaBudde et al.
6,107,620 A * 8/2000 Shiba et al.

FOREIGN PATENT DOCUMENTS

| JP | 3-278330 | 12/1991 |
| JP | 7-211985 | * 8/1995 |

* cited by examiner

Primary Examiner—W. R. Young
(74) Attorney, Agent, or Firm—Sughrue Mion, PLLC

(57) ABSTRACT

An optical pickup device includes a semiconductor laser for emitting forward and backward laser light from front and back emergent end faces thereof, focusing device for focusing the forward laser light emergent from the front emergent end face of said semiconductor laser onto an optical recording medium, a light-receiving element for signal reproduction for detecting return light from the optical recording medium, and a light-guiding system for guiding the return light to said light-receiving element for signal reproduction, said optical pickup device being provided with a light source unit having an arrangement in which said semiconductor laser and said light-receiving element for signal reproduction being incorporated in a common package and shielding device, disposed inside said package of said light source unit, for preventing the light emitted from said semiconductor laser from being incident upon said light-receiving element for signal reproduction.

5 Claims, 15 Drawing Sheets

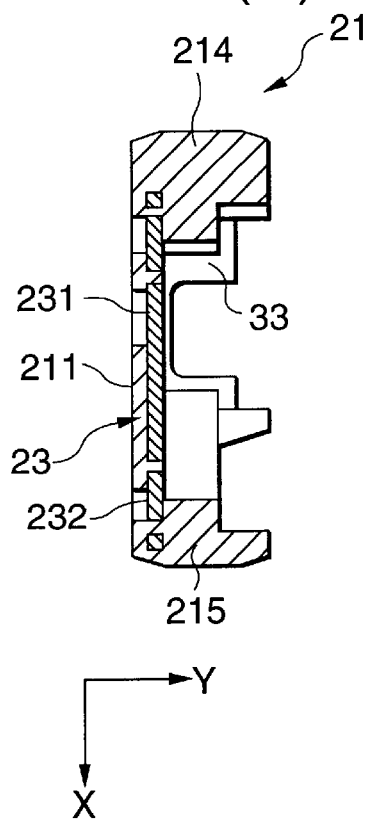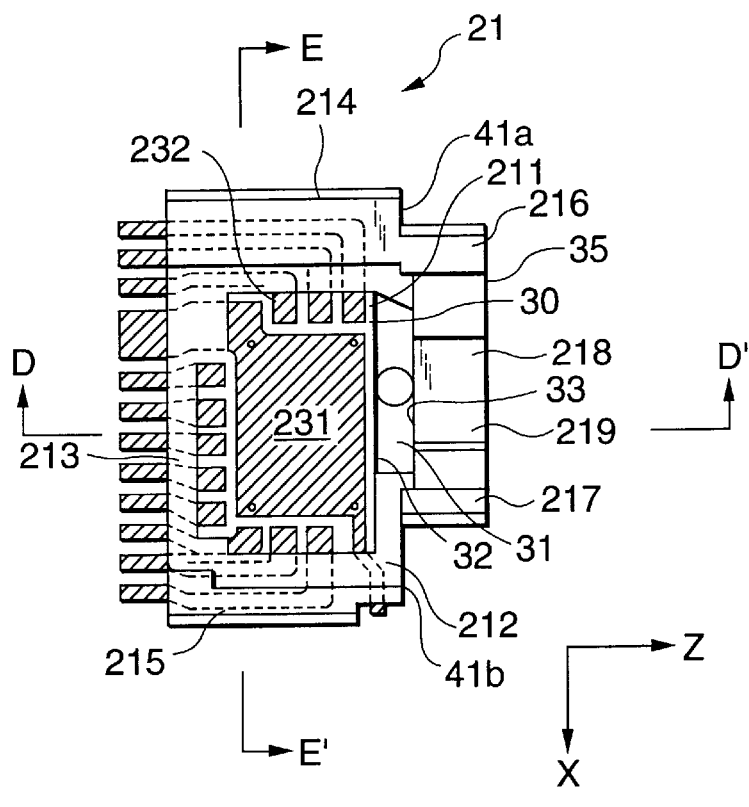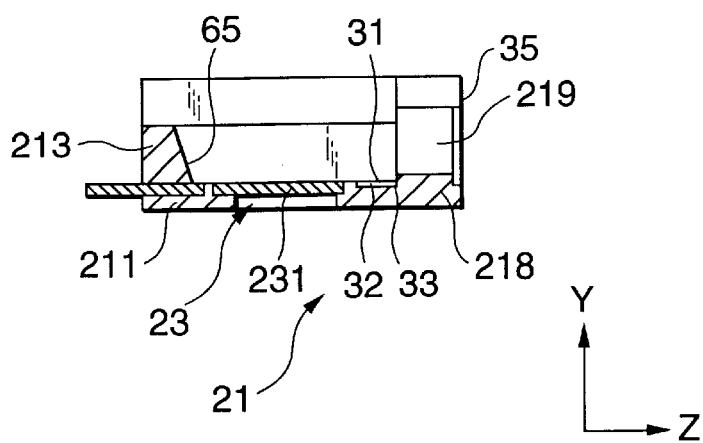

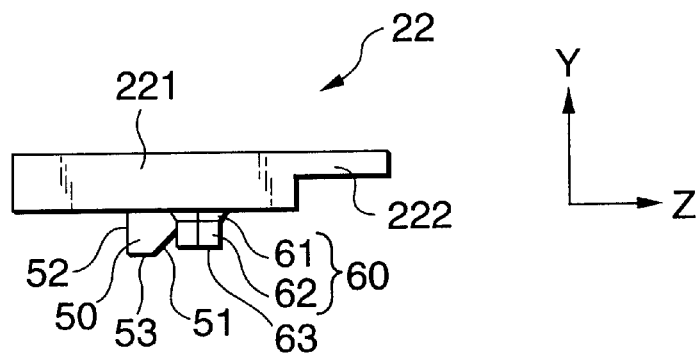
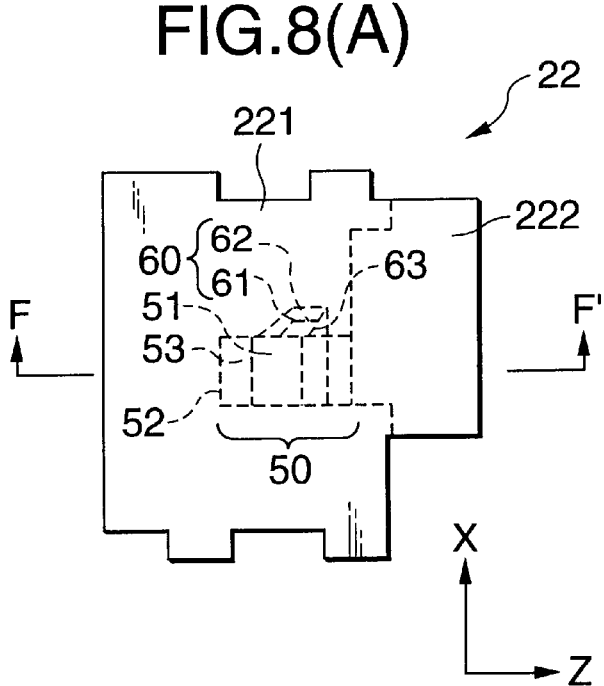
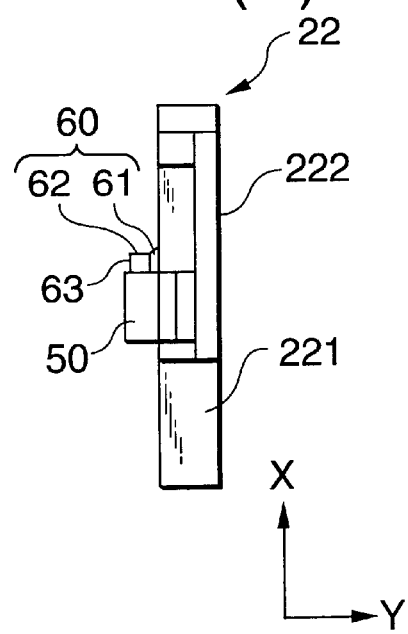
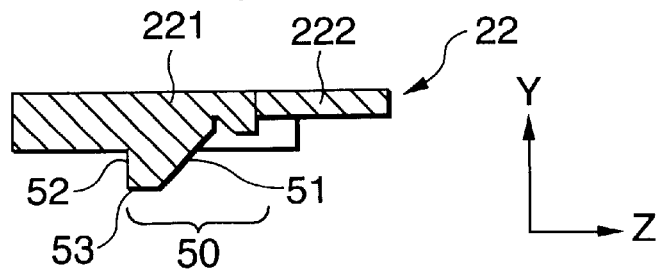

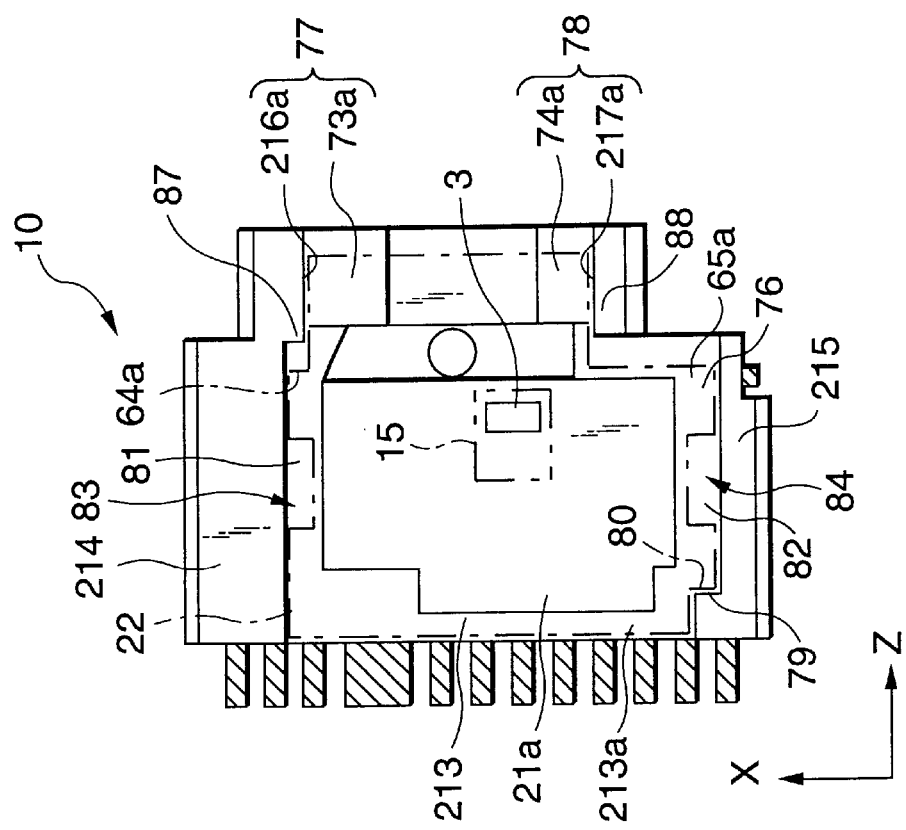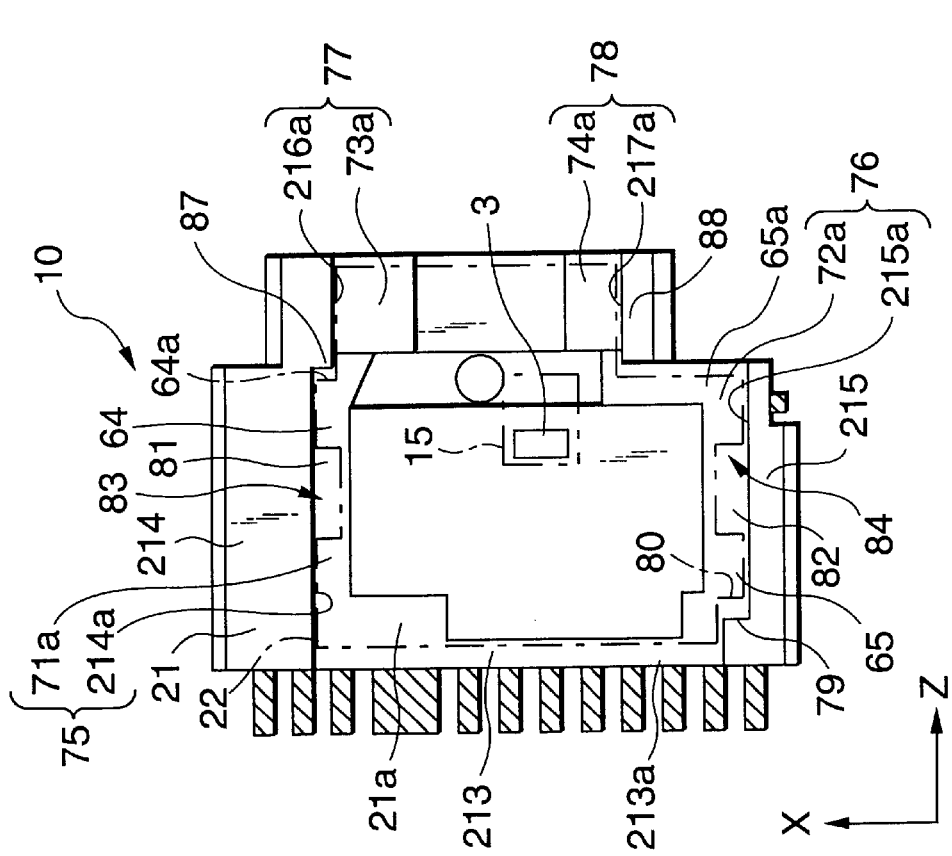
FIG.12(A)
FIG.12(B)

OPTICAL PICKUP DEVICE HAVING A SHIELDING PROTECTION

BACKGROUND OF INVENTION

1. Field of Invention

The present invention relates to an optical pickup device having among others a light source unit having an arrangement in which a semiconductor laser and a light-receiving element are incorporated in a common package.

2. Related Art

As an optical pickup device used in the recording and reproduction of an optical disk such as a CD, a DVD, and an MO, an optical pickup device is known which has a light source unit having an arrangement in which optical elements such as a semiconductor laser, a light-receiving element, and a hologram element are incorporated in a package. Such an optical pickup device is disclosed in, for instance, Unexamined Japanese Patent Unexamined Publication Hei.3-278330.

In the optical pickup device disclosed Unexamined Japanese Patent Unexamined Publication Hei.3-278330, a hologram element and an objective lens are arranged in that order from the semiconductor laser toward the optical disk. In addition, an objective lens, a hologram element, and a reflecting mirror are arranged in that order from the optical disk toward a light-receiving element (for signal reproduction).

In this optical pickup device, the semiconductor laser is disposed on a semiconductor substrate which is fixed to a heat sink, and these members are integrated as a light source unit. In this light source unit, a sub-heat sink is mounted on the semiconductor substrate, and the semiconductor laser is mounted on its upper surface and emits laser light in a direction parallel to the substrate surface of the semiconductor substrate. The light-receiving element (for signal reproduction) is formed in the rear of the semiconductor laser on the substrate surface of the semiconductor substrate, and the reflecting mirror is disposed above this light-receiving element. Further, in addition to the light-receiving element for signal reproduction, a monitoring light-receiving element for feedback-controlling a laser light output of the semiconductor laser is also formed in the rear of the semiconductor laser.

In this optical pickup device, the laser light (forward laser light) which is made emergent from a front emergent end face of the semiconductor laser is transmitted through the hologram element and is then focused onto the optical disk through the objective lens. The return light from the optical disk is diffracted by the hologram element, and is then made to fall down by the reflecting mirror and is guided to the light-receiving element for signal reproduction. The signal reproduction, tracking error detection, and focusing error detection are effected in correspondence with the result of detection by this light-receiving element.

In addition, in this type of optical pickup device, part of the laser light (backward laser light) which is made emergent from a back emergent end face of the semiconductor laser directly irradiates the monitoring light-receiving element which is formed on the semiconductor substrate surface. On the basis of the result of detection by this monitoring light-receiving element, feedback control is effected so that the laser light output of the semiconductor laser becomes fixed.

The major causes of deterioration of the accuracy of the return light from the optical disk are as follows.

First, the forward laser light and the backward laser light which are made emergent from the front and back emergent end faces of the semiconductor laser have spreads in which the light spreads beyond an effective angle of divergence. In particular, the spread in a direction perpendicular to an active layer is large. In a conventional optical pickup device, of the backward laser light, a light component (an effective bundle of rays) having a large light intensity and having an effective angle of divergence is utilized as monitoring light.

The light component which spreads outside the effective bundle of rays and which is not utilized as the monitoring light is radiated in a direction which deviates from the light-receiving surface of the monitoring light-receiving element. Hence, there is a possibility that part of it is made directly incident upon the light-receiving element for signal reproduction which is disposed in the rear of the semiconductor laser.

If unwanted light (stray light) other than the return light from the optical disk is incident upon the light-receiving element for signal reproduction, the proportion of the noise component included in the output signal from the light-receiving element for signal reproduction increases. Consequently, the accuracy of the return light from the optical disk which is made incident upon the light-receiving element for signal reproduction deteriorates. Specifically, drawbacks occur such as a substantial decline in the S/N ratio as well as instability in the tracking and focus controlling operation of the objective lens.

It is conceivable to dispose the light-receiving element for signal reproduction on the side of the semiconductor laser so that the component of the backward laser light which is not utilized as the monitoring light will not be directly incident upon the light-receiving element for signal reproduction. However, in this case as well, there is a possibility that the light is reflected on an inner wall surface of the package and is made indirectly incident upon the light-receiving element for signal reproduction. Similarly, the forward laser light also as a possibility that part of the light component which spreads outside the effective bundle of rays is made incident upon the light-receiving element for signal reproduction.

Next, in the arrangement in which the return light from the optical disk is guided to the light-receiving element for signal reproduction by using the light-guiding element (the reflecting mirror or the prism), if the accuracy of the mounting position of the light-guiding element or the light-receiving element for signal reproduction is poor, the return light fails to focus on a desired position on the light-receiving element for signal reproduction.

If the focusing position of the return light in the light-receiving element for signal reproduction is not appropriate, the accuracy of the return light from the optical disk which is incident upon the light-receiving element for signal reproduction deteriorates, and it is impossible to obtain a target signal, so that the accuracy in the reproduction of the optical disk and in the tracking control and autofocus control of the objective lens deteriorates. In particular, in the light source unit which incorporates the light-guiding element and the light-receiving element for signal reproduction in a package, it is difficult to mount the light-guiding element and the light-receiving element for signal reproduction accurately at desired positions.

Insofar as the output of the forward laser light is indirectly feedback-controlled on the basis of the output of the backward laser light as in the optical pickup device having the above-described configuration, the actual output of the forward laser light varies, and it is naturally impossible to expect improvement in the accuracy of the return light from the optical disk which is incident upon the light-receiving element for signal reproduction.

Further, as for the optical disks such as a CD-R, a DVD-ROM, a DVD-R, an MD, and a PD, a laser light output during recording (an output which is about 10 times the laser light output during reproduction) is set for the specifications of each disk. For this reason, if the laser light output deviates from a light output range suitable for the optical disk subject to recording due to the variation of the output of the forward laser light in the above-described manner, a drawback occurs such as the distortion of the shape of the write pit. In addition, at the time of reproduction, if the laser light output becomes excessively large, there is a possibility that the data written in the optical disk may be deleted.

Here, it is conceivable to guide part of the forward laser light to the monitoring light-receiving element by using a reflecting plate or the like, but a new optical element such as the reflecting plate is required. If the new optical element is required, the cost of the light source unit becomes high, and it takes time in the operation of assembling the element.

SUMMARY OF INVENTION

With the conventional devices, the accuracy of the return light from the optical disk has been poor due to the above-described causes, so that it has not been possible to accurately effect the reproduction and recording of the optical disk and tracking and autofocus control of the focusing means. Accordingly, the present invention provides an optical pickup device which overcomes this problem.

According to an aspect of the present invention, there is provided an optical pickup device comprising:

- a semiconductor laser for emitting forward and backward laser light from front and back emergent end faces thereof;
- focusing means for focusing the forward laser light emergent from the front emergent end face of said semiconductor laser onto an optical recording medium;
- a light-receiving element for signal reproduction for detecting return light from the optical recording medium, and
- a light-guiding system for guiding the return light to said light-receiving element for signal reproduction, said optical pickup device being provided with a light source unit having an arrangement in which said semiconductor laser and said light-receiving element for signal reproduction being incorporated in a common package; and
- shielding means, disposed inside said package of said light source unit, for preventing the light emitted from said semiconductor laser from being incident upon said light-receiving element for signal reproduction.

As described above, in accordance with the present invention, it becomes possible to improve the accuracy of the return light from the optical disk which is incident upon the light-receiving element for signal reproduction, and stabilize the tracking and focus controlling operation of the focusing means, thereby making it possible to accurately effect reproduction and recording of the optical disk and tracking and focusing control of the focusing means.

BRIEF DESCRIPTION OF DRAWINGS

FIG. 4(A) is a plan view of a package body which is a component element of a package of the light source unit;

FIG. 4(B) is a cross-sectional view taken along line D–D' of FIG. 4(A);

FIG. 4(C) is a cross-sectional view taken along line E–E' of FIG. 4(A);

FIG. 8(A) is a plan view of a package cover plate which is a component element of the package of the light source unit;

FIGS. 8(B) and 8(C) are left and right side elevational views thereof, respectively;

FIG. 8(D) is a cross-sectional view taken along line F–F' of FIG. 8(A);

FIGS. 12(A) and 12(B) are diagrams illustrating the states in which the package cover plate is slid in the back-and-forth direction with respect to the package body;

DETAILED DESCRIPTION OF THE PREFERRED EMBODIMENTS

Figure 1:
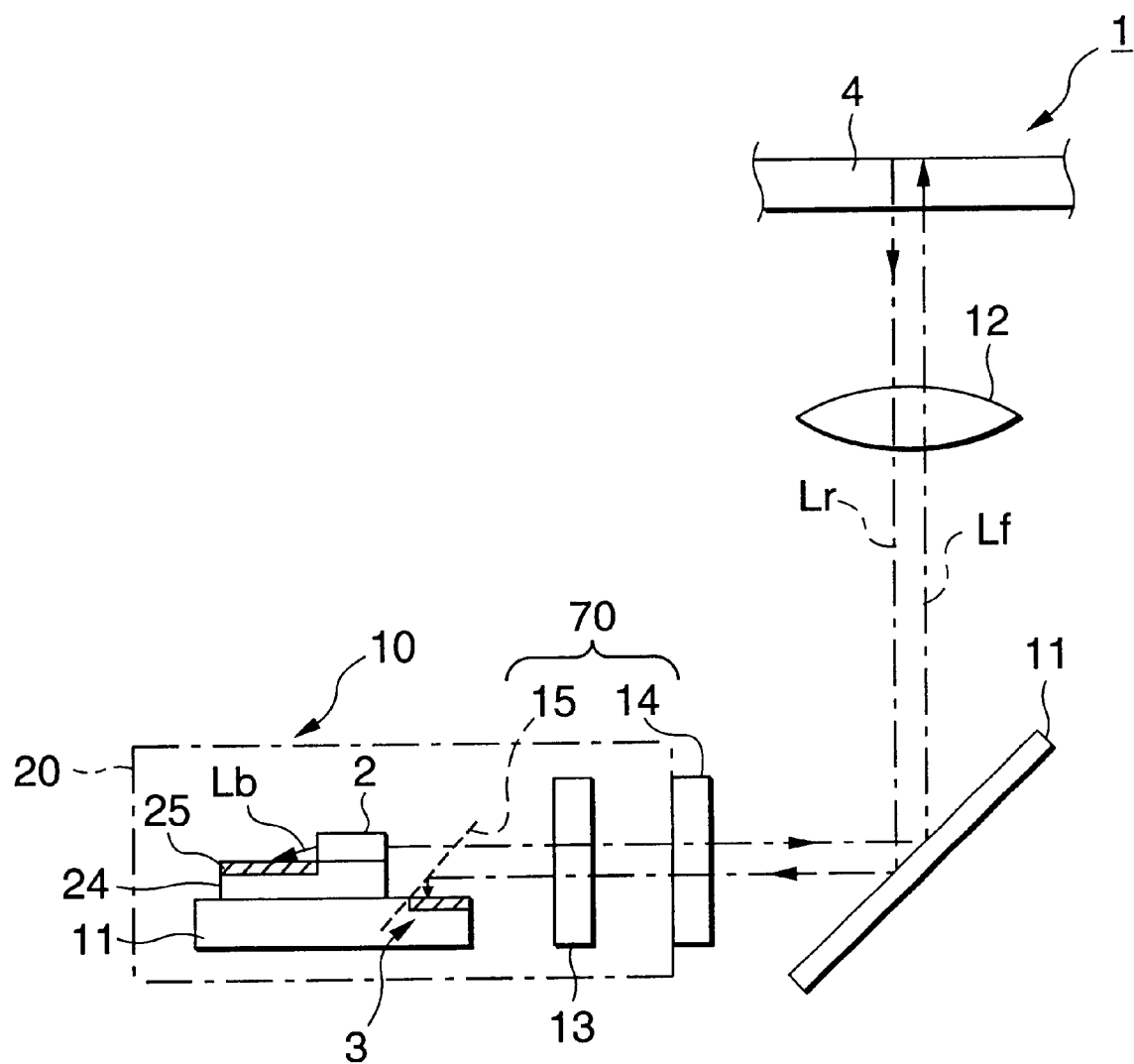
FIG. 1 is a schematic diagram of an optical system of an optical pickup device to which the present invention is applied.

Referring now to the drawings, a description will be given of an embodiment of the present invention.

Overall Configuration of the Optical Pickup Device

FIG. 1 shows a schematic configuration of an optical system of the optical pickup device. An optical pickup device 1 is comprised of a semiconductor laser 2; an upward-reflecting mirror 11 for upwardly reflecting laser light Lf emitted therefrom; an objective lens (focusing means) 12 for focusing the upwardly reflected laser light Lf onto an optical disk 4; a light-receiving element 3 for signal reproduction for detecting return light Lr from the optical disk 4; and a light-guiding system 70 for guiding the return light Lr from the optical disk 4 to the light-receiving element 3 for signal reproduction. Further, the optical pickup device 1 has a first diffracting element (separating means) which is disposed at a midway position in an optical path leading from these miconductor laser 2 to the upward-reflecting mirror 11. This first diffracting element 13 is an element for separating the laser light emitted from the semiconductor laser 2 into laser light for signal reproduction and a laser light for tracking-error detection.

The light-guiding system 70 has a second diffracting element 14 for diffracting the return light Lr from the optical disk 4 as a light-guiding element, as well as a reflecting mirror 15 for guiding the light diffracted by this second diffracting element 14 to the light-receiving element 3 for signal reproduction.

In this optical pickup device 1 of this example, the semiconductor laser 2, the light-receiving element 3 for signal reproduction, the light-guiding system 70, and the first diffracting element 13 are incorporated in a common package 20, and are integrated as a light source unit 10.

Configuration of the Light Source Unit

Figure 2C:
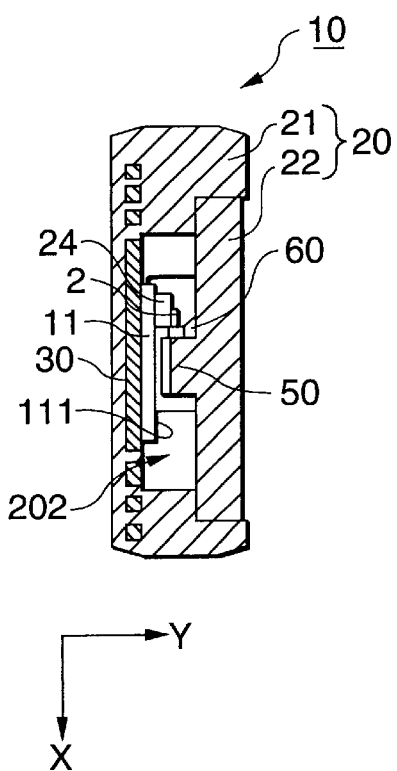
FIG. 2(C) is a cross-sectional view taken along line B–B' of FIG. 2(A)
Figure 2A:
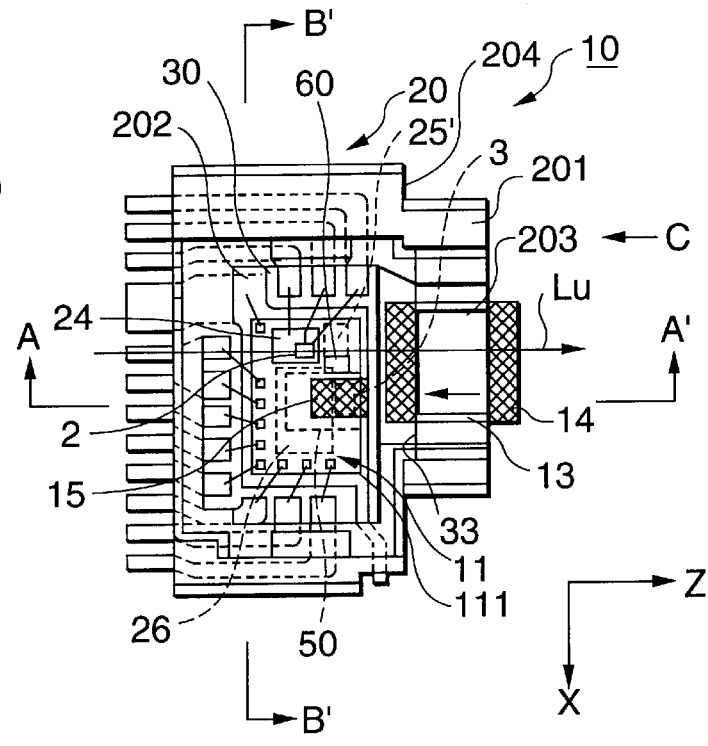
FIG. 2(A) is a schematic diagram of a light source unit.
Figure 2B:
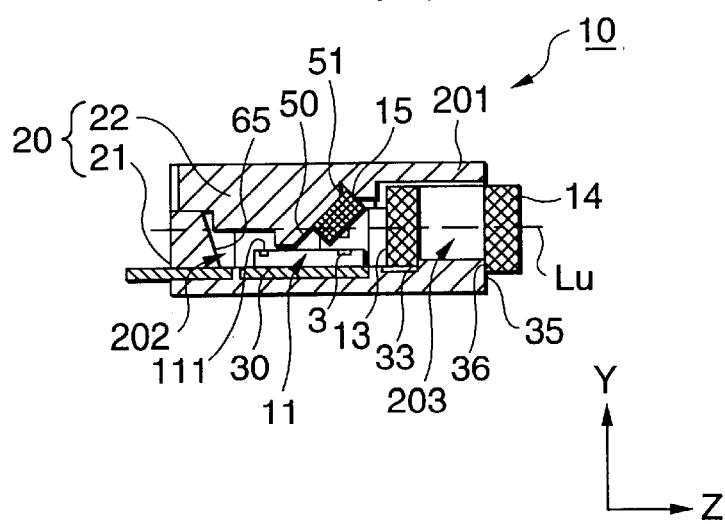
FIG. 2(B) is a cross-sectional view taken along line A–A' of FIG. 2(A)
Figure 3:
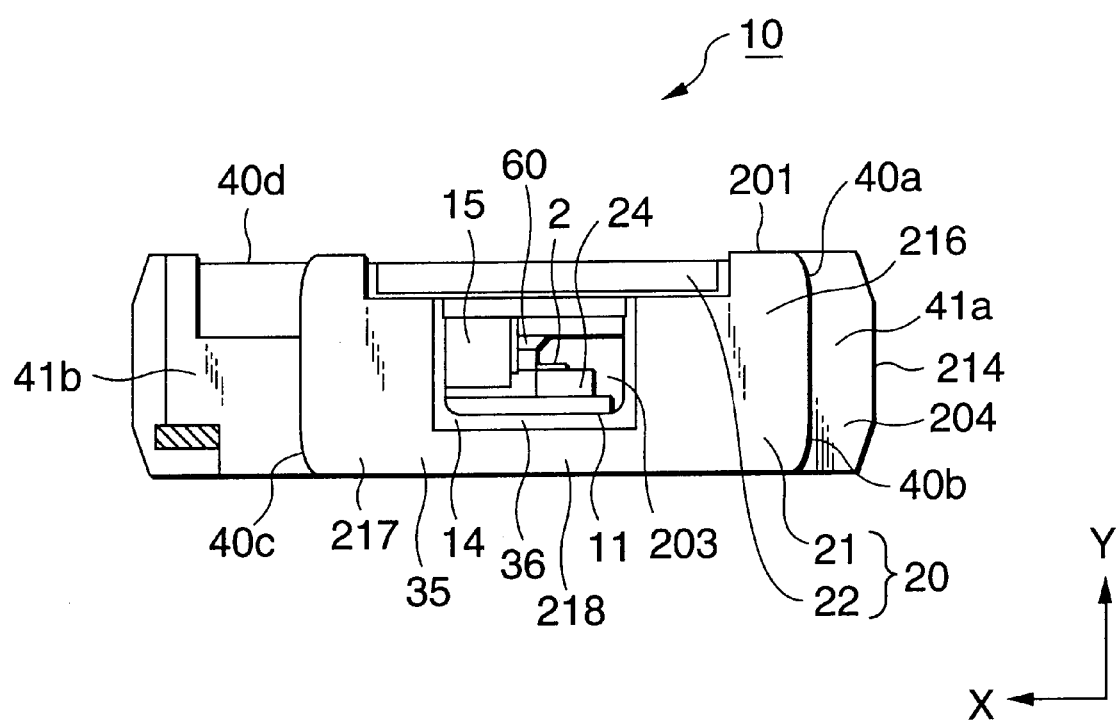
FIG. 3 is a front elevational view of the light source unit shown in FIG. 2(A)

FIGS. 2 and 3 show the light source unit. FIG. 2(A) is a plan view of the light source unit, and FIGS. 2(B) and 2(C) are a cross-sectional view taken along line A–A' of FIG. 2(A) and a cross-sectional view taken along line B–B' thereof, respectively. FIG. 3 is a front elevational view of the light source unit taken from the front direction (in the direction of arrow C in FIG. 2(A).

It should be noted that, in FIG. 2(A), portions of the package are omitted to facilitate the understanding of the internal arrangement of the light source unit. In addition, in the following description, a description will be given by setting the widthwise direction of the package as the X direction, the vertical direction of the package as the Y direction, and the back-and-forth direction of the package as the Z direction.

As shown in these drawings, the package 20 of the light source unit 10 has a flat rectangular parallelepiped. Provided inside this package 20 are the semiconductor substrate 11, a submount 24 mounted on a substrate surface 111 of the semiconductor substrate 11, the semiconductor laser 2 disposed on the upper surface of this submount 24, and the light-receiving element 3 for signal reproduction formed on the substrate surface 111 of the semiconductor substrate 11. In addition, the reflecting mirror 15 and the first and second diffracting elements 13 and 14 are fitted in the package 20.

A tubular projection 201 which projects perpendicularly in the forward direction is formed on a front surface 204 of the package 20. A light transmitting hole 203 is formed by this tubular projection 201, and the first and second diffracting elements 13 and 14 are fitted therein. The forward laser light Lf emitted from the semiconductor laser 2 is made emergent to the outside through these elements 13 and 14, and the return light Lr from the optical disk 4 is guided to the interior of the package 20.

The package 20 is formed by a substantially box-shaped package body 21 with its top open and a package cover plate 22 which closes the upper opening. A chamber 202 in which the semiconductor substrate 11, the submount 24, and the like are fitted is defined and formed by the package body 21 and the package cover plate 22, and the tubular projection 201 is also formed thereby.

FIG. 4(A) is a plan view of the package body, and FIGS. 4(B) and 4(C) are a cross-sectional view taken along line D–D' of FIG. 4(A) and a cross-sectional view taken along line E–E' thereof, respectively. As shown in these drawings, the package body 21 has a substantially rectangular bottom wall 211, as well as a front wall 212, a rear wall 213, and left and right side walls 214 and 215 which rise up from the four sides of the bottom wall 211. A portion of the front wall 212 is cut away in a recessed form, and a pair of left and right projecting side walls 216 and 217 extend from both sides thereof perpendicularly to the front wall 212. Lower end portions of these projecting side walls 216 and 217 are connected by a projecting bottom wall 218 extending forward from the bottom wall 211. A protruding portion 219 which protrudes forward is formed by the projecting side walls 216 and 217 and the projecting bottom wall 218.

The width of the protruding portion 219 is narrower than the width of the package body 21, and the protruding portion 219 is formed at a position offset from the widthwise center of the package body 21.

The surface of the bottom wall 211 of the package body 21 is made flat, and is used as a reference plane 30 for defining the positions of the semiconductor laser 2, the submount 24, and the semiconductor substrate 11. A rectangular plate-shaped stage 231 in a lead frame 23 is fixed to this reference plane 30. As for leads (in this example, 12 leads) 232 of the lead frame 23, their pad portions are located at the reference plane 30, and their portions which serve as terminals for external connection are passed through the rear wall 213 of the package body 21 and extend to the outside. These terminal portions for external connection are arranged in the widthwise direction of the package at fixed intervals.

Configurations of the Semiconductor Substrate and its Peripheral Portions

Figure 5:
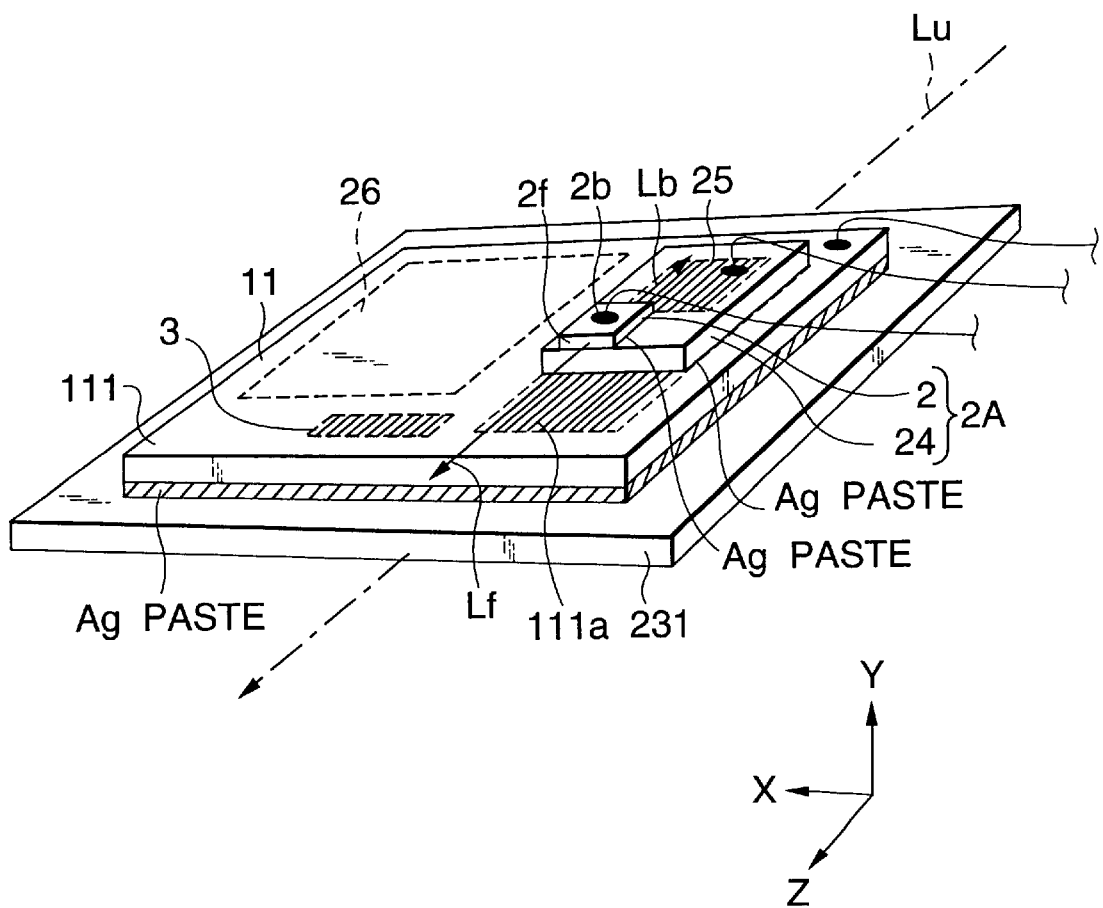
FIG. 5 is an enlarged perspective view of a semiconductor substrate and its peripheral portions in the light source unit of the optical pickup device.
Figure 6:
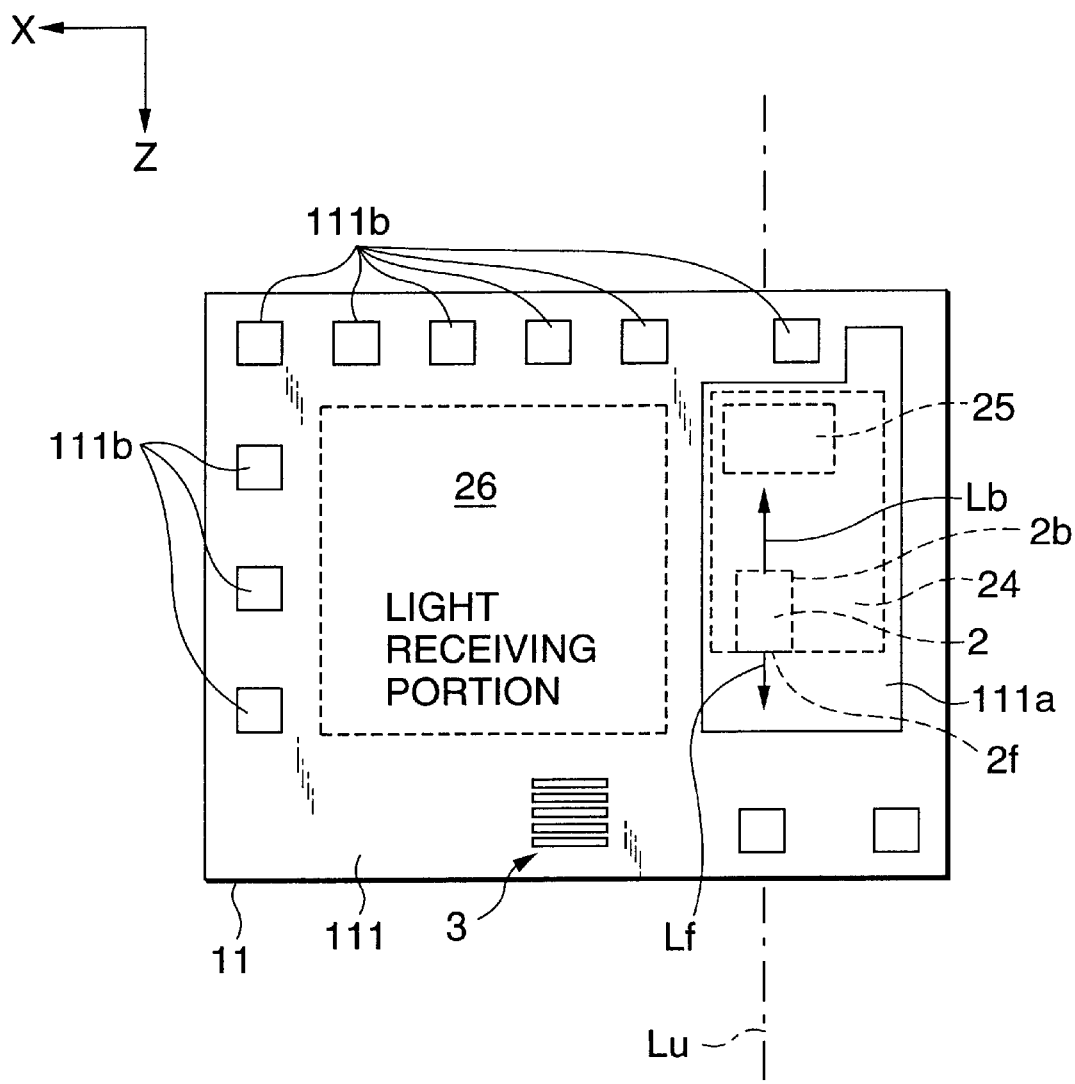
FIG. 6 is an enlarged plan view illustrating a substrate surface of the semiconductor substrate in the light source unit of the optical pickup device.

FIG. 5 is a perspective view illustrating the semiconductor substrate and its peripheral portions in enlarged form, and FIG. 6 is a plan view illustrating the substrate surface of the semiconductor substrate. As shown in FIGS. 2, 5, and 6, the semiconductor substrate 11 is bonded to the stage 231 of the lead frame 23, shown in FIG. 4, by silver paste. On the substrate surface 111 of the semiconductor substrate 11, a substantially rectangular electrode portion 111a which is elongated in the back-and-forth direction is formed on one side thereof in its widthwise direction, while a signal processing circuit 26 is formed on the other side thereof. The submount 24 is fixed on top of the electrode portion 111a by silver paste. This submount 24 is formed of a semiconductor substrate of a fixed thickness, and the semiconductor laser 2 is fixed on its upper surface by silver paste.

The semiconductor laser 2 has a front emergent end face 2f from which the forward laser light Lf is made emergent and a back emergent end face 2b from which backward laser light Lb is made emergent. The laser light Lf and Lb is respectively made emergent from these emergent end faces 2f and 2b in the forward direction and in the backward direction in a direction parallel to the substrate surface 111 of the semiconductor substrate 11.

The light-emitting point of the forward laser light Lf of the semiconductor laser 2 is located in a substantially vertical center of the package 20 at the front emergent end face 2f, and the forward laser light Lf emitted therefrom is transmitted through the first and second diffracting elements 13 and 14 fitted in the light transmitting hole 203, and is made emergent to the outside.

The signal processing circuit 26 formed on the side of the electrode portion 111a on the substrate surface 111 of the semiconductor substrate 11 is a circuit for enhancing the level of the output signal from the light-receiving element 3 for signal reproduction so as to facilitate the processing for generating a pit signal (RF signal), a tracking error signal (TE signal), and a focus error signal (FE signal) in an external controller. The light-receiving element 3 for signal reproduction is formed in front of this signal processing circuit 26. Accordingly, the light-receiving element 3 for signal reproduction is formed at a position located forwardly of the front emergent end face 2f of the semiconductor laser 2 and at a position laterally offset from an optical axis Lu of the forward laser light Lf.

There are two methods as a monitoring means for feedback-controlling the laser light output of the semiconductor laser 2. In one method, a monitoring light-receiving element 25 for feedback-controlling the laser light output of the semiconductor laser 2 is formed at a position located rearwardly of the semiconductor laser 2 on the upper surface of the submount 24, and part of the backward laser light Lb emergent from the back emergent end face 2b of the semiconductor laser 2 is made directly incident upon the monitoring light-receiving element 25. In the other method, an arrangement is provided such that a monitoring light-receiving element 25' is formed at a position located forwardly of the front emergent end face 2f of the semiconductor laser 2 on the substrate surface 111 of the semiconductor substrate 11, but its details will be described later.

Configuration of Light-Receiving Element for Signal Reproduction

Figure 7:
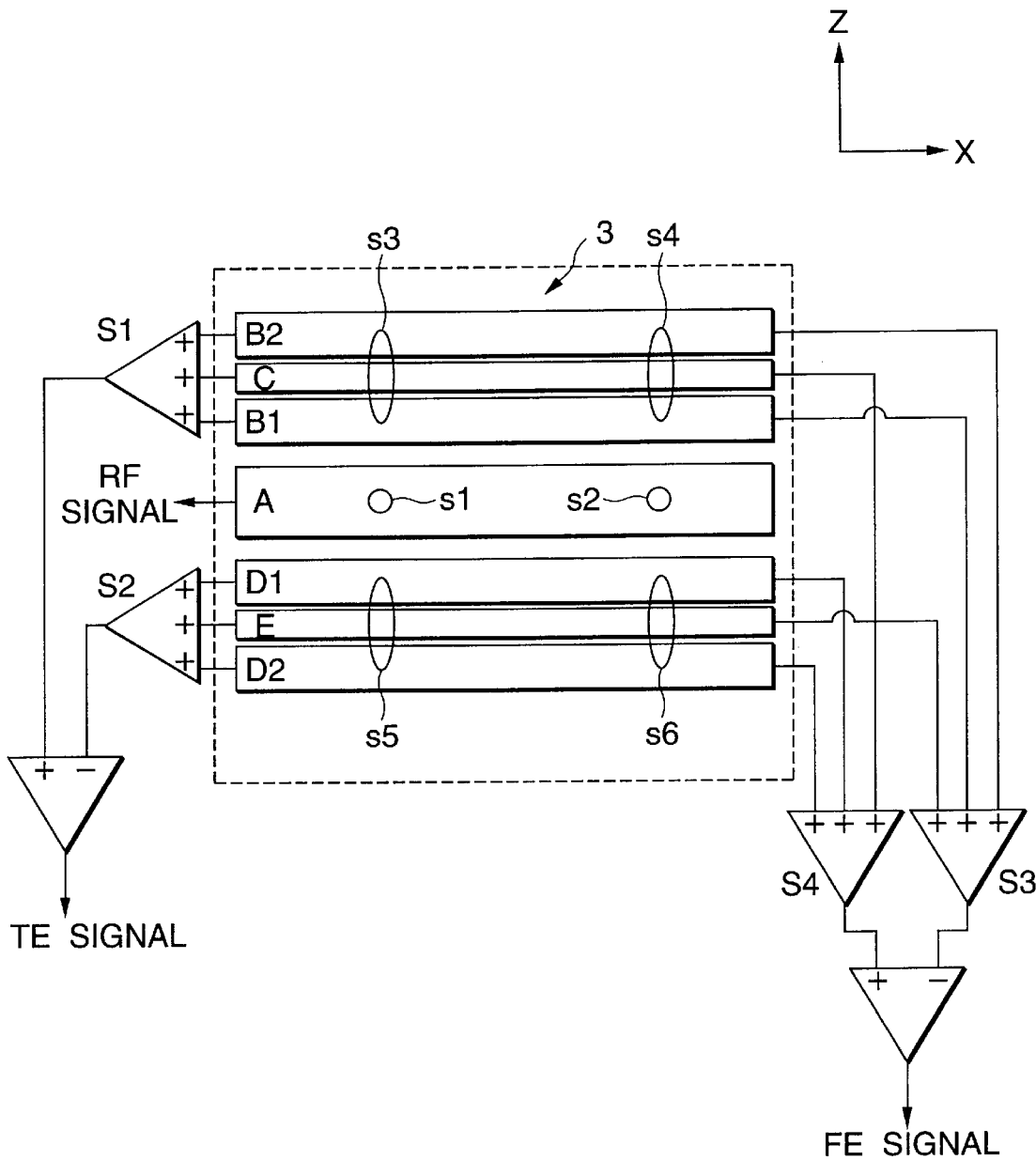
FIG. 7 is an enlarged plan view illustrating a light-receiving element for signal reproduction in the light source unit of the optical pickup device.

FIG. 7 shows the light-receiving element 3 for signal reproduction in enlarged form. As shown in this drawing, the light-receiving element 3 for signal reproduction has seven elongated light-receiving surfaces A, B1, B2, C, D1, D2, and E extending in the widthwise direction (X direction) of the package 20. The light-receiving surface A is for detecting the pit signal (RF signal), and the remaining light-receiving surfaces are for detecting the tracking error signal (TE signal) and the focus error signal (FE signal). In the light-receiving element 3 for signal reproduction, the remaining light-receiving surfaces are arranged in threes in the back-and-forth direction, centering on the light-receiving surface A. The light-receiving surface B1, the light-receiving surface C, and the light-receiving surface B2 are arranged in that order in front of the light-receiving surface A, while the light-receiving surface D1, the light-receiving surface E, and the light-receiving surface D2 are arranged in that order in the rear of the light-receiving surface A. The amounts of light received at these light-receiving surfaces are converted to electrical signals, and are supplied to the signal processing circuit 26. It should be noted that the methods of generating the tracking error signal (TE signal) and the focus error signal (FE signal) will be described later.

The signal processing circuit 26 is comprised of such as an I/V (intensity/voltage) amplifier unit for converting the electrical signals into voltages corresponding to the amounts of light received while amplifying the electrical signals supplied from the respective light-receiving surfaces, as well as an operating circuit for performing at appropriate timings operations with respect to the signals obtained by the I/V amplifier unit.

Outputs of the signal processing circuit 26 are fetched to the outside from electrodes 111b formed on the substrate surface 111 of the semiconductor substrate 11.

The electrodes 111b are electrically connected to the pad portions of the predetermined leads of the lead frame 23 by wire bonding (see FIG. 2). In addition, electrodes (not shown) formed on the semiconductor laser 2 and the submount 24 are also electrically connected to the pad portions of the predetermined leads 232 by wire bonding. The output signals from the electrodes 111b are led to the controller (not shown) disposed outside the light source unit 10 through the lead frame 23 so as to generate the RF signal, the TE signal, and the FE signal and to effect feedback control of the laser light output of the semiconductor laser 2.

Mounting Structure of the Reflecting Mirror

As shown in FIGS. 2 and 3, in the light source unit 10, the reflecting mirror 15 is mounted at a predetermined position in the package 20. There flecting mirror 15 has a rectangular shape, and is mounted on the package cover plate 22 which defines an inner surface portion of the package 20 which opposes the substrate surface 111 of the semiconductor substrate 11 of the package 20.

FIG. 8(A) is a plan view of the package cover plate 22, and FIGS. 8(B) and 8(C) are a left side-elevational view and a front elevational view thereof, respectively. Further, FIG. 8(D) is a cross-sectional view taken along line F–F' of FIG. 8(A). The package cover plate 22 closes the upper opening of the package body 21, and is basically formed by an upper wall portion 221 defining an upper wall of the package 20 and an extended portion 222 extending in the forward direction from a front end side of the upper wall portion 221. Both the upper wall portion 221 and the extended portion 222 have substantially fixed thicknesses, and the thickness of the upper wall portion 221 is greater than that of the extended portion 222. A mirror-mounting portion 50 for the reflecting mirror 15 is formed integrally on the package inner surface of the upper wall portion 221.

This mirror-mounting portion 50 is a projection with a trapezoidal cross section which is formed in such a manner as to project from immediately above the light-receiving element 3 for signal reproduction toward the rear. The front surface of this trapezoidal mirror-mounting portion 50 is a mirror-mounting surface 51 which is inclined by 45 degrees toward the front, and the reflecting mirror 15 is fixed thereto by an adhesive agent or the like.

The return light Lr from the optical disk 4 which is incident into the package through the first and second diffracting elements 13 and 14 strikes the reflecting mirror 15, and is reflected orthogonally downward by the mirror 15 so as to irradiate the light-receiving element 3 for signal reproduction.

Figure 9:
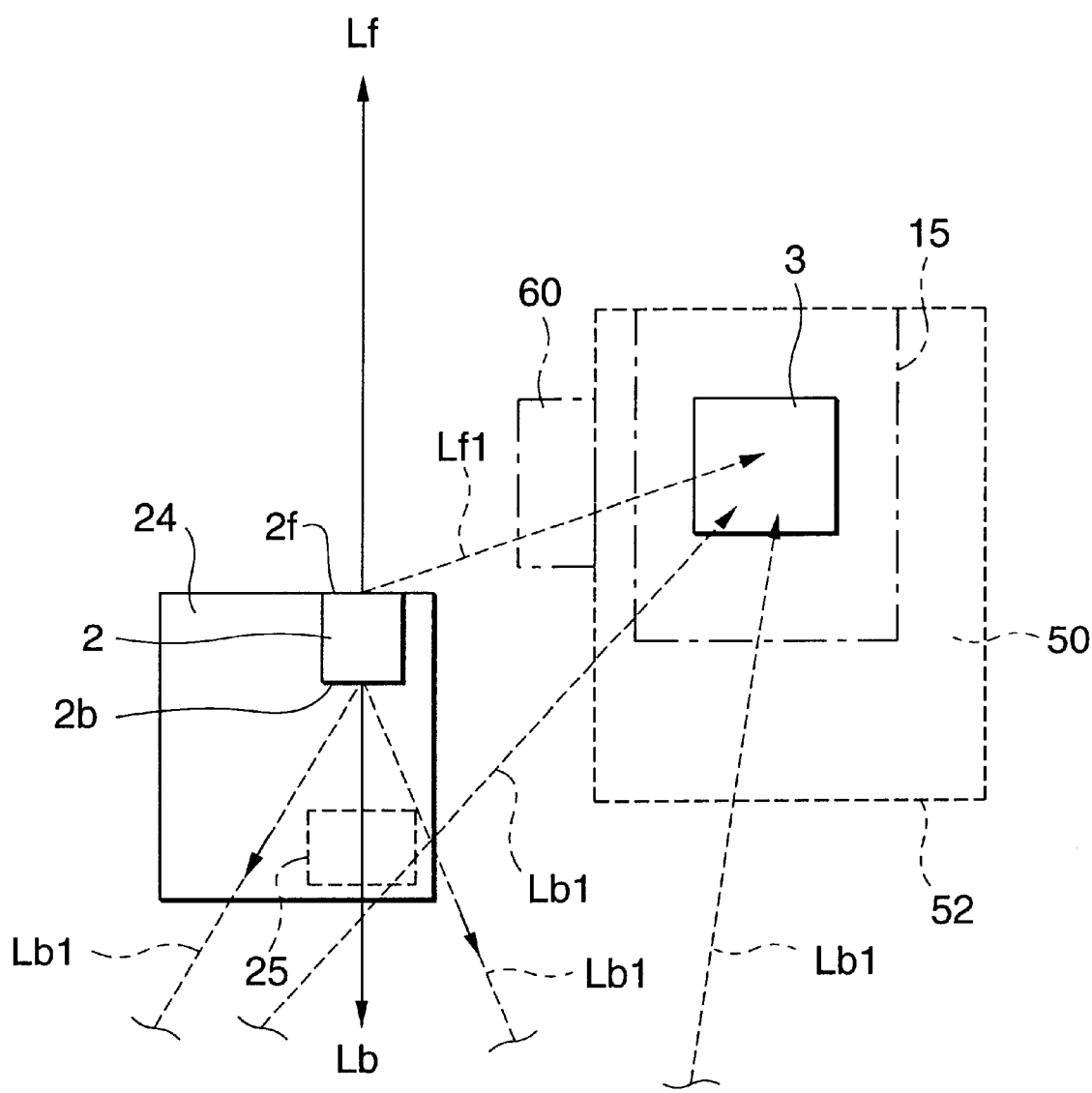
FIG. 9 is a diagram schematically illustrating the state of emission of forward and backward laser light emitted from a semiconductor laser.

As shown in FIGS. 8 and 9, a rear surface 52 of the mirror-mounting portion 50 is a perpendicular surface, and is located rearwardly of the back emergent end face 2b of the semiconductor laser 2 mounted on the submount 24.

A shielding projection (shielding wall) 60 for shielding a light component directed from the semiconductor laser 2 toward the light-receiving element 3 for signal reproduction (part of the forward laser light Lf emergent from the front emergent end face 2f of the semiconductor laser 2) is formed on the side of the mirror-mounting portion 50 underneath the upper wall portion 221 of the package cover plate 22. This shielding projection 60 is formed integrally with the mirror-mounting portion 50, and has a prismoidal portion 61 extending downward in such a manner as to taper from the upper wall portion 221, as well as a prismatic portion 62 which further extends perpendicularly downward from its lower surface. A lower end face 63 of the shielding projection 60 is at substantially the same height as that of a lower end face 53 of the mirror-mounting portion 50, and is located on a line connecting the front emergent end face 2f of the semiconductor laser 2 and the light-receiving element 3 for signal reproduction.

FIG. 9 schematically illustrates the state of emission of the forward and backward laser light Lf and Lb emitted from the semiconductor laser 2. The forward and backward laser light Lf and Lb emergent from the respective emergent end faces 2f and 2b of the semiconductor laser 2 has a spread in which the light spreads beyond its effective angle of divergence.

For this reason, a partial light component (stray light) Lf1 of the forward laser light Lf emergent from the emergent end face 2f of the semiconductor laser 2 has a possibility of being made directly incident upon the light-receiving element 3 for signal reproduction located forwardly of that front emergent end face 2f. However, in the light source unit 10 of the first embodiment, the shielding projection 60 is disposed between the front emergent end face 2f and the light-receiving element 3 for signal reproduction, and the front emergent end face 2f and the light-receiving element 3 for signal reproduction are in a state of being virtually partitioned by this shielding projection 60.

Accordingly, since the aforementioned light component Lf1 his shielded by the shielding projection 60, it is possible to prevent the light component Lf1 from reaching the light-receiving element 3 for signal reproduction.

It should be noted that the shielding projection 60 has the function of making it possible to reliably prevent the light component Lf1 of the forward laser light Lf emergent from the front emergent end face 2f of the semiconductor laser 2 from reaching the light-receiving element 3 for signal reproduction, and the amount of its projection and its shape should be determined so that the function can be sufficiently demonstrated.

In addition, part (the effective bundle of rays) of the backward laser light Lb emergent from the back emergent end face 2b of the semiconductor laser 2 is made directly incident upon the monitoring light-receiving element 25, and is utilized as monitoring light for feedback-controlling the laser light output of the semiconductor laser 2.

Accordingly, of the backward laser light Lb, a light component (stray light) Lb1 which fails to be coupled to the monitoring light-receiving element 25 also has the possibility of undergoing multiple reflection on the inner walls of the package 20 and being directed to the light-receiving element 3 for signal reproduction. Accordingly, the mirror-mounting portion 50 of the light source unit 10 in this embodiment projects from the package cover plate 22 side toward the substrate surface 111 of the semiconductor substrate 11, and extends in the rearward direction. For this reason, the semiconductor laser 2 and the light-receiving element 3 for signal reproduction are virtually partitioned from each other by the mirror-mounting portion 50. Therefore, since the aforementioned light component Lb1 is shielded by the mirror-mounting portion 50, it is possible to prevent the part Lb1 of the backward laser light Lb from being made incident upon the light-receiving element 3 for signal reproduction.

In addition, the rear end surface 52 of the mirror-mounting portion 50 is located rearwardly of the back emergent end face 2b of the semiconductor laser 2. If such an arrangement is adopted, in comparison with the case where the rear end surface 52 is located forwardly of the back emergent end face 2b, it is possible to more reliably prevent the stray light in the package from being incident upon the light-receiving element 3 for signal reproduction. It should be noted that the amount of projection of the mirror-mounting portion 50 is of such a nature as to be determined to allow the aforementioned light component Lb1 to be reliably shielded.

Thus, with the light source unit 10, it is possible to prevent the light (stray light) other than the return light Lr from the optical disk 4 from being made incident upon the light-receiving element 3 for signal reproduction. Accordingly, since the noise component attributable to the stray light can be eliminated from the output signal of the light-receiving element 3 for signal reproduction, it is possible to improve the accuracy of the return light from the optical disk made incident upon the light-receiving light for signal reproduction, enhance the S/N ratio, and stabilize the tracking and focus controlling operation of the objective lens 12.

Figure 10:
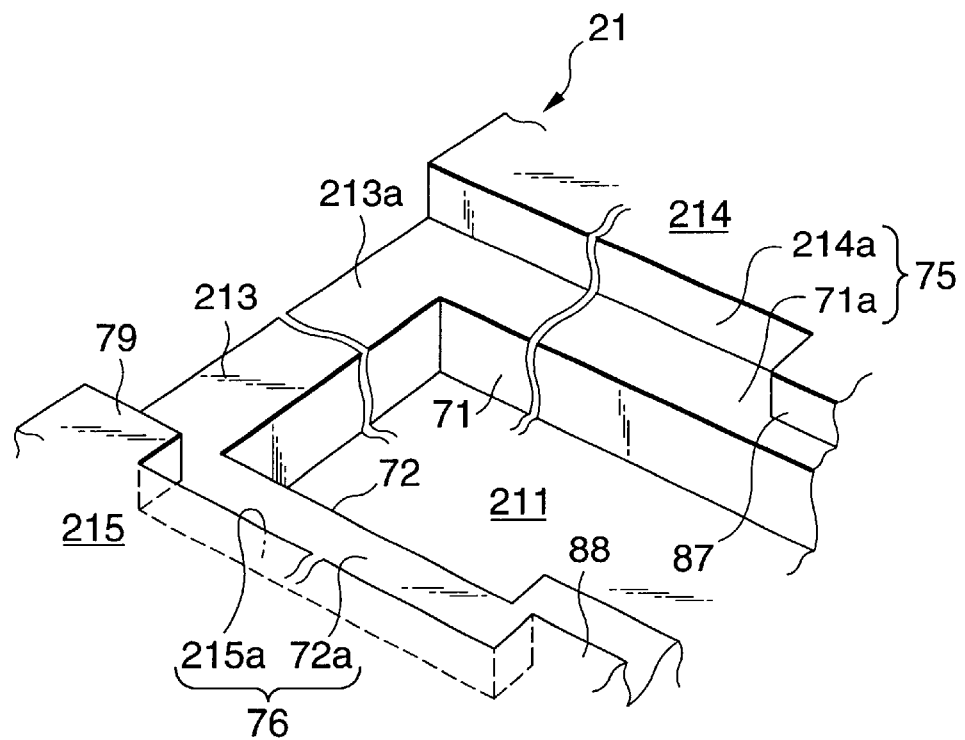
FIG. 10 is an enlarged perspective view of a portion of the package body in the light source unit of the optical pickup device.
Figure 11:
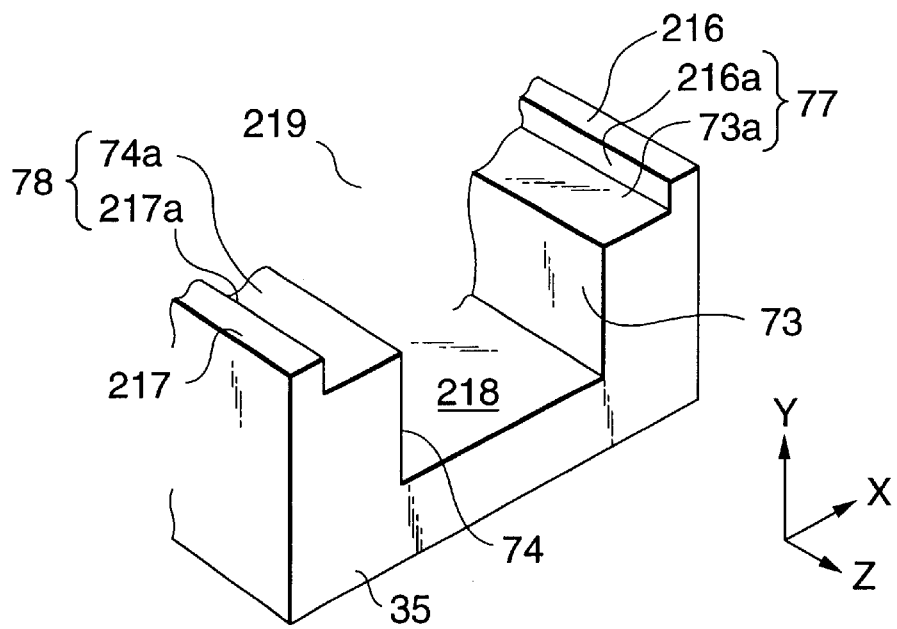
FIG. 11 is an enlarged perspective view of a portion of an extended portion of the package body in the light source unit of the optical pickup device.

Means for Adjusting the Mounting Positions of the Light-Receiving Element for Signal Reproduction and the Reflecting Mirror Referring next to FIGS. 10, 11, and 12, a description will be given of means for adjusting the mounting positions of the light-receiving element for signal reproduction and the reflecting mirror. FIG. 10 is an enlarged perspective view of a portion of the package body. FIG. 11 is an enlarged perspective view of a portion of the extended portion of the package body. FIGS. 12(A) and 12(B) are diagrams illustrating the states in which the package cover plate is slid in the back-and-forth direction with respect to the package body, FIG. 12(A) and 12(B) being diagrams illustrating the states in which the package cover plate is slid in the forward direction and in the backward direction, respectively.

As shown in FIG. 10, the rear wall 213 of the package body 21 is lower than the left and right side walls 214 and 215. On the inner sides of the left and right side walls 214 and 215, inner wall portions 71 and 72 of the same height as the. rear wall 213 are formed integrally on the side walls 214 and 215. These inner wall portions 71 and 72 extend in the back-and-forth direction.

Rear portions of the inner wall portions 71 and 72 are connected to the rear wall 213. Upper surfaces of the rear wall 213 and the inner wall portions 71 and 72 are respectively formed as horizontal surfaces 213a, 71a, and 72a, and these surfaces continue to each other. Inner side surfaces of the side walls 214 and 215 which continue to the horizontal surfaces 71a and 72a of the inner wall portions 71 and 72 are vertical surfaces 214a and 215a.

As shown in FIG. 11, on the inner sides of the left and right projecting side walls 216 and 217 in the extended portion 219 of the package body 21, inner wall portions 73 and 74 which are higher than the inner wall portions 71 and 72 are formed integrally on the projecting side walls 216 and 217. These inner wall portions 73 and 74 extend in the back-and-forth direction, and their upper surfaces are horizontal surfaces 73a and 74a. The inner side surfaces of the projecting side walls 216 and 217 which continue to these horizontal surfaces 73a and 74a are vertical surfaces 216a and 217a.

Accordingly, if the package cover plate 22 is assembled onto the package body 21, left and right edge portions 64 and 65 on the rear surface of the upper wall portion 221 in the package cover plate 22, on the one hand, and the horizontal surfaces 71a and 72a of the inner wall portions 71 and 72, on the other hand, are combined, while the left and right side surfaces of the upper wall portion 221 and the vertical surfaces 214a and 215a are combined. Also, the rear edge portion 63 on the rear surface of the upper wall portion 221 and the horizontal surface 213a of the rear wall 213 are combined. In the extended portion 222 of the package cover plate 22, left and right edge portions 66 and 67 on the rear surface of the extended portion 222 and the horizontal surfaces 73a and 74b of the inner wall portions 73 and 74 are combined, while the left and right side surfaces of the extended portion 222 and the vertical surfaces 216a and 217a are combined. Thus, combination surfaces are arranged between the package cover plate 22 and the package body 21.

Here, in the light source unit 10, a mounting-position adjusting means capable of adjusting the relative positions of the light-receiving element 3 for signal reproduction and the reflecting mirror 15, as well as a fixing means for fixing the light-receiving element 3 for signal reproduction and the reflecting mirror 15 at the positions after adjustment by the mounting-position adjusting means, are provided. The mounting-position adjusting means is formed by the package body 21 and the package cover plate 22 which are combined in such a manner as to be slidable in the direction of the optical axis of the forward laser light Lf (in the back-and-forth direction of the package 20) emitted from a laser light source 2A.

The mounting-position adjusting means has guide surfaces 75, 76, 77, and 78 for guiding the package cover plate 22 with respect to the package body 21 only in the direction of the optical axis of the forward laser light Lf. These guide surfaces 75 to 78 are formed as parts of the combination surfaces of the package body 21 and the package cover plate 22.

The guide surfaces 75 and 76 are formed on the inner sides of the left and right side walls 214 and 215 of the package body 21. The guide surfaces 75 and 76 are the surfaces with L-shaped cross sections which oppose each other along the optical axis Lu of the forward laser light Lf, and extend in the back-and-forth direction along the side walls 214 and 215.

The guide surface 75 is formed by the horizontal surface 71a of the inner wall portion 71 formed on the inner side of the side wall 214, as well as the vertical surface 214a of the side wall 214. The guide surface 76 is formed by the horizontal surface 72a of the inner wall portion 72 formed on the side wall 215, as well as the vertical surface 215a of the side wall 215.

The guide surfaces 77 and 78 are formed on the inner sides of the left and right projecting side walls 216 and 217 of the extended portion 219 in the package body 21. The guide surfaces 77 and 78 are the surfaces with L-shaped cross sections which oppose each other along the optical axis Lu of the forward laser light Lf. The guide surfaces 77 and 78 extend in the back-and-forth direction along the projecting side walls 216 and 217.

The guide surface 77 is formed by the horizontal surface 73a of the inner wall portion 73 formed on the inner side of the projecting side wall 216, as well as the vertical surface 216a of the projecting side wall 216. The guide surface 78 is formed by the horizontal surface 74a of the inner wall portion 74 formed on the projecting side wall 217, as well as the vertical surface 217a of the projecting side wall 217.

The length of the package cover plate 22 in the back-and-forth direction is slightly shorter than the length of a corresponding upper opening 21a. For this reason, in the state in which the package cover plate 22 is assembled onto the package body 21, the package cover plate 22 is reciprocatable in the back-and-forth direction with respect to the package body 21.

Engaging projections 87 and 88 for preventing the forward movement of the package cover plate 22 are formed on the front sides of the left and right guide surfaces 75 and 76 in the package body 21. An engaging projection 79 is formed on the rear side of the right guide surface 76. An engaging notch 80 is formed in a rear-end portion of the right edge portion 65 in the package cover plate 22 in correspondence with this engaging projection 79.

Notches 81 and 82 which are formed by cutting away parts of the edge portions 64 and 65 in rectangular shapes are formed in the left and right edge portions 64 and 65 of the package cover plate 22. These notches 81 and 82 oppose each other in a state in which the optical axis Lu of the forward laser light Lf emitted from the laser light source 2A is located therebetween. Jig engaging portions 83 and 84 are formed in portions of the combination surfaces of the package body 21 and the package cover plate 22 by means of these notches 81 and 82. These jig engaging portions 83 and 84 are rectangular recessed portions. Consequently, these jig engaging portions 83 and 84 can be caught by a jig, and the package cover plate 22 can be slid in the back-and-forth direction with respect to the package body 21 by the jig.

With such a light source unit 10, the relative mounting positions of the reflecting mirror 15 and the light detecting element 3 can be adjusted as follows. First, the package cover plate 22 and the package body 21 are combined. Subsequently, the jig engaging portions 83 and 84 of the package cover plate 22 are caught by the jig (not shown), and the package cover plate 22 is moved forward or backward by the jig. At this time, the package cover plate 22 is guided only in the back-and-forth direction by the guide surfaces 75, 76, 77, and 78. As can be seen from FIGS. 11(A) and 11(B), the position of the reflecting mirror 15 assembled onto the package cover plate 22 moves in parallel in the back-and-forth direction. As a result, the relative positions of the reflecting mirror 15 and the light detecting element 3 are adjusted.

After the relative positions of the reflecting mirror 15 and the light-receiving element 3 for signal reproduction are thus adjusted, the jig is removed from the jig engaging portions 83 and 84. Subsequently, an adhesive agent (fixing means) is allowed to flow into these jig engaging portions 83 and 84, thereby bonding and fixing together the package cover plate 22 and the package body 21. This makes it possible to prevent the adjusted relative positions of the reflecting mirror 15 and the light-receiving element 3 for signal reproduction from becoming offset.

Here, as shown in FIG. 12(A), if the package cover plate 22 is slid forward, the engaging projections 87 and 88 formed on the left and right side walls 214 and 215 of the package body 21 and left and right front portions 64a and 65a of the upper wall portion 221 of the package cover plate 22 abut against each other, thereby making it impossible to slide the package cover plate 22 further forward. That is, the forward movement of the package cover plate 22 is prevented.

On the other hand, as shown in FIG. 12(B), if the package cover plate 22 is slid backward, the engaging projection 79 formed on the rear side of the right guide surface 76 of the package body 21 and the notch 80 formed in the package cover plate 22 abut against each other, thereby making it impossible to slide the package cover plate 22 further backward. That is, the backward movement of the package cover plate 22 is prevented. Thus, since the forward and backward movement of the package cover plate 22 can be stopped at a predetermined position, the package cover plate 22 is prevented from coming off the package body 21.

As described above, with the light source unit 10 of the optical pickup device 1, the relative positions of the reflecting mirror 15 and the light detecting element 3 can be adjusted by sliding the package cover plate 22 with the reflecting mirror 15 assembled onto it in the back-and-forth direction with respect to the package body 21 with the light-receiving element 3 for signal reproduction assembled onto it. For this reason, the relative positional relationship between the light detecting element 3 and the reflecting mirror 15 can be set to an appropriate relationship.

In addition, after adjustment of the relative positions, since the package body 21 and the package cover plate 22 are fixed by injecting the adhesive agent into the jig engaging portions 83 and 84, the adjusted positional relationship between the light detecting element 3 and the reflecting mirror 15 can be maintained. Accordingly, the return light Lf from the optical disk 4 can be reliably focused to a desired position on the light-receiving element 3 for signal reproduction. As a result, since a target signal can be reliably obtained from the light-receiving element 3 for signal reproduction, the reproduction and recording in the optical disk 4 and the tracking and focusing control of the objective lens 12 can be effected accurately.

In addition, with the light source unit 10, the reflecting mirror 15 is mounted on the package cover plate 22, and the light detecting element 3 is mounted on the package body 21. For this reason, even if there is an error in the assembly of the reflecting mirror 15 onto the package cover plate 22 or an error in the assembly of the light detecting element 3 onto the package body 21, the positional relationship between the reflecting mirror 15 and the light detecting element 3 can be set to an appropriate relationship by sliding the package cover plate 22.

Furthermore, with the light source unit 10, the relative positions of the reflecting mirror 15 and the light-receiving element 3 for signal reproduction can be adjusted by merely sliding the package cover plate 22 in the back-and-forth direction. For this reason, there is an advantage in that the thickness and the width of the light source unit 10 do not change at the time of this adjustment. In addition, with the light source unit 10, the jig engaging portions 83 and 84 formed in the package cover plate 22 can be caught by the jig, and the package cover plate 22 can be slid by using the jig. Since the jig can be used, the package cover plate 22 can be simply moved with respect to the package body 21.

Arrangement of the Monitoring Light-Receiving Element

Referring to FIG. 2, a description will be given of the example in which the monitoring light-receiving element is disposed in front of the front emergent end face of the semiconductor laser. In this example, as shown by the chain lines in FIG. 2, the monitoring light-receiving element 25' is formed at a position located forwardly of the front emergent end face 2f of the semiconductor laser 2 on the substrate surface 111 of the semiconductor substrate 11. The part Lf1 of the forward laser light Lf emergent from the front emergent end face 2f of the semiconductor laser 2 is made directly incident upon the monitoring light-receiving element 25'.

Here, the position which is located forwardly of the front emergent end face 2f of the semiconductor laser 2 and laterally of the light-receiving element 3 for signal reproduction is a position where the space is liable to be a dead space. The monitoring light-receiving element 25' is formed at this position.

Namely, the light-receiving element 3 for signal reproduction, the monitoring light-receiving element 25', the signal processing circuit 26, and the like are built in an optimally arranged state on the substrate surface 111 of the semiconductor substrate 11, and effective use is made of the region on the substrate surface 111.

If the monitoring light-receiving element 25' is not disposed at a position located forwardly of the front emergent end face 2f of the semiconductor laser 2, there is a possibility that after the part Lf1 of the forward laser light Lf is reflected by the substrate surface 111, the part Lf1 of the forward laser light Lf is reflected inside the package 20 and is made incident upon the light-receiving element 3 for signal reproduction. If the part Lf1 of the forward laser light Lf is made incident upon the light-receiving element 3, noise is included in the output signal of the light-receiving element 3. In this embodiment, since the monitoring light-receiving element 25' is formed at the aforementioned position, it is possible to prevent noise from becoming included in the output signal of the light-receiving element 3 owing to the incidence of the part Lf1 of the forward laser light Lf upon the light-receiving element 3.

In addition, since it is unnecessary to emit the backward laser light in the case of this example, forward laser light of a high output can be emitted by a small driving current by enhancing the reflectivity at the back emergent end face of the semiconductor laser. Further, since the part of the forward laser light is directly received by the monitoring light-receiving element, it is unnecessary to build a new optical element for this feedback control into the package.

Here, as shown in FIGS. 2, 3 and FIG. 4(B), the inner wall of the package 20 opposing the back emergent end face 2b of the semiconductor laser 2, i.e., the inner side surface 65 of the rear wall 213 of the package body 21, is formed as an inclined surface having an upwardly tapered section. If the inner side surface 65 of the rear wall 213 is thus formed as the inclined surface, i.e., if the inner side surface 65 is inclined at an angle which is not orthogonal to the optical axis of the backward laser light Lb, the amount of backward laser light Lb directed toward the light-receiving element 3 for signal reproduction after being reflected by this inner side surface 65 can be reduced. It should be noted that this inner side surface 65 may be inclined with a downwardly tapered section. Still alternatively, the inner side surface 65 may be formed as an inclined surface which is inclined in the widthwise direction of the package 20.

Mounting Structures of the First and Second Diffracting Elements

Both the first diffracting element 13 and the second diffracting element 14 are rectangular in shape, and are mounted on the package body 21.

Figure 13:
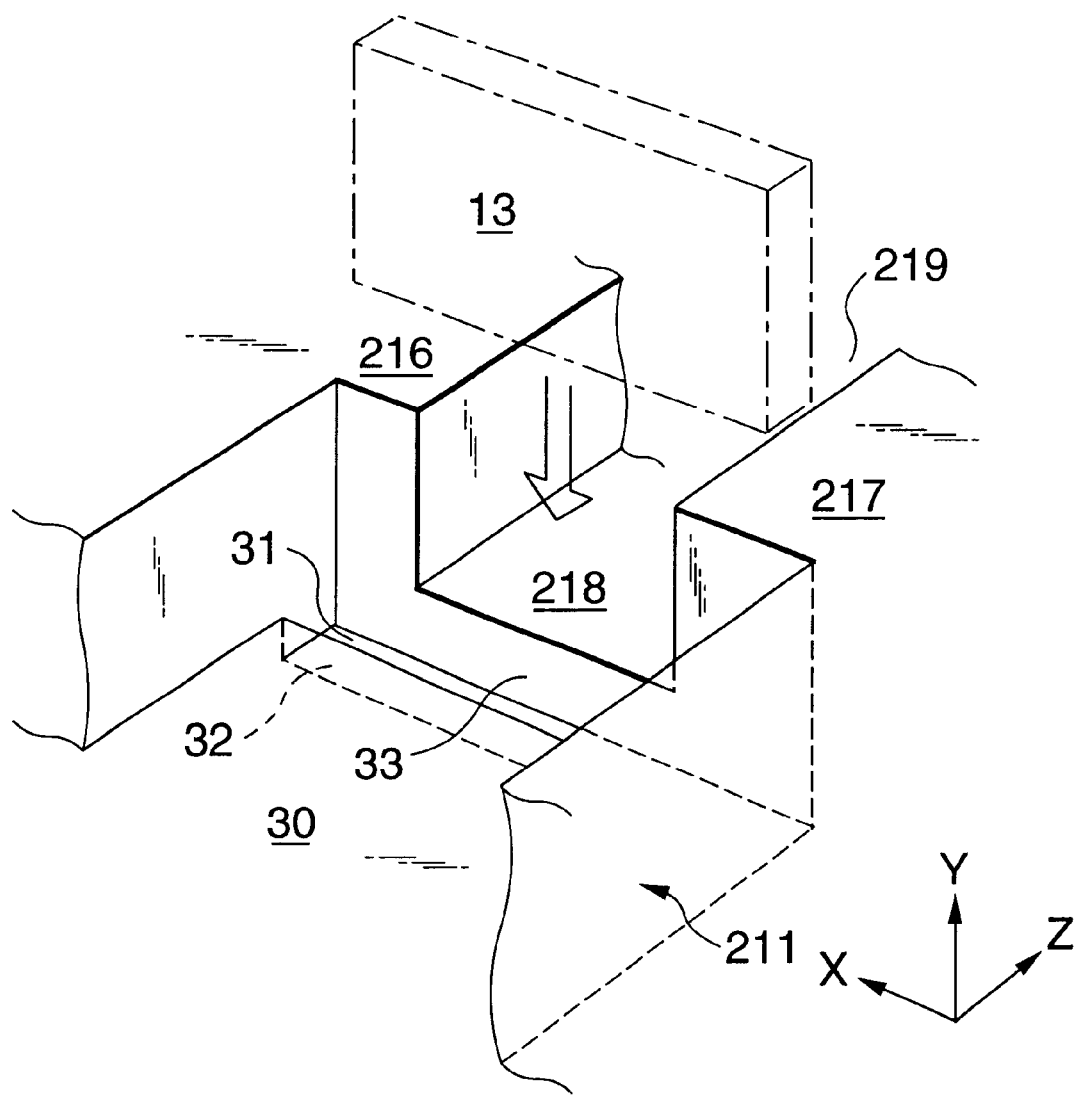
FIG. 13 is a diagram for explaining a structure for mounting a first diffracting element in the light source unit of the optical pickup device.
Figure 14:
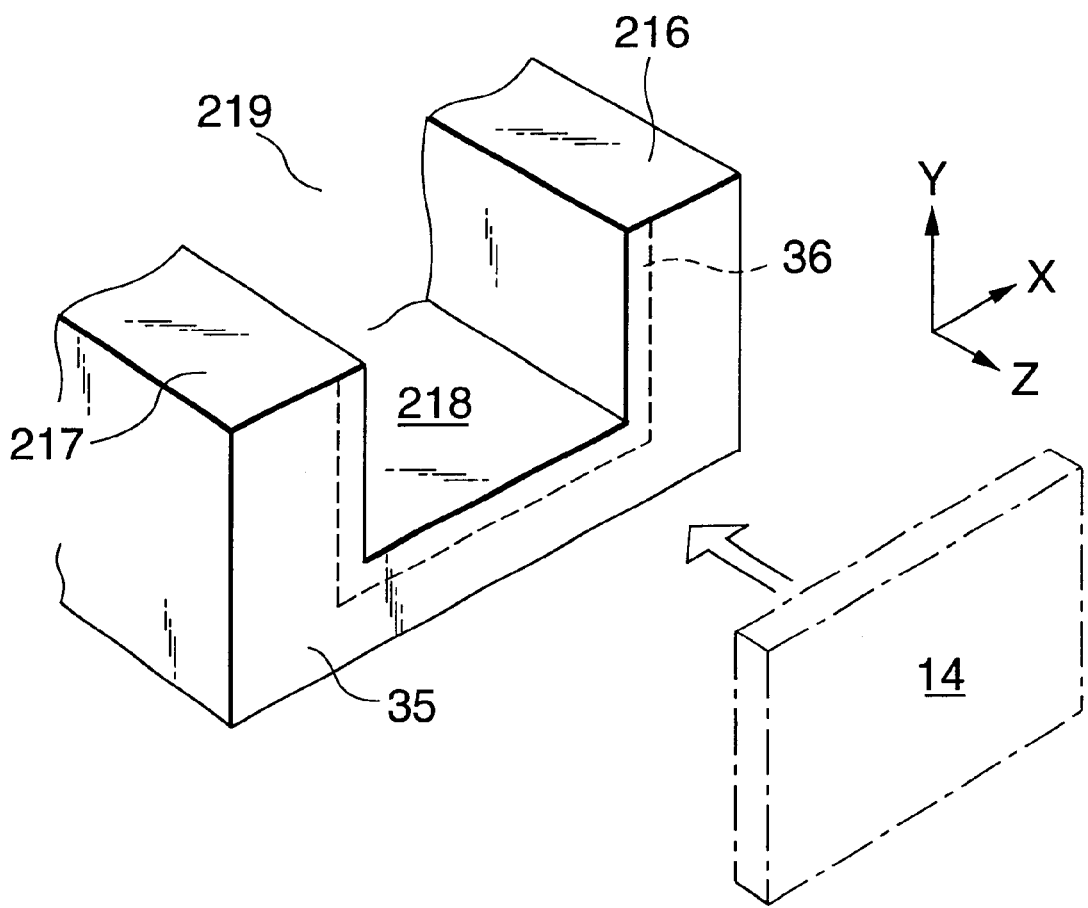
FIG. 14 is a diagram for explaining a structure for mounting a second diffracting element in the light source unit of the optical pickup device.

FIG. 13 schematically illustrates a structure for mounting the first diffracting element 13, and FIG. 14 schematically illustrates a structure for mounting the second diffracting element 14. As shown in FIG. 13, a horizontal stepped surface 31 which is lower than the reference plane 30 is formed on the reference plane 30 of the package body 21 at its boundary with the extended portion 219. This stepped surface 31 is formed along the widthwise direction of the package 20, and its lengthwise dimension in the back-and-forth direction is fixed. A rising surface 32 which is perpendicular to the stepped surface 31 is formed at a boundary between the stepped surface 31 and the reference plane 30, while a rising surface (mounting surface) 33 which is perpendicular to the stepped surface 31 is formed at a boundary between the stepped surface 31 and the extended portion 219.

Accordingly, if the first diffracting element 13 is disposed in such a manner as to abut against the rising surface 33, its disposed position in the back-and-forth direction is automatically defined. In addition, the attitude of the first diffracting element 13 is automatically defined such that the optical axis of the first diffracting element 13 becomes substantially parallel to the optical axis Lu of the forward laser light Lf from the semiconductor laser 2 emergent through the light transmitting hole 203. Incidentally, after the disposed position of the first diffracting element 13 is finely adjusted in the widthwise direction of the package 20 in this state, the first diffracting element 13 is fixed by an adhesive agent or the like.

As shown in FIG. 14, a front surface of the extended portion 219 is a vertical surface. In addition, the second diffracting element 14 has a size slightly larger than the opening of the light transmitting hole 203. Accordingly, if the second diffracting element 14 is disposed in such a manner as to abut against edge portions (mounting surface) 36 of the front surface 35 which define a portion of the opening of the light transmitting hole 203 in the package 20, its disposed position in the back-and-forth direction is automatically defined. In addition, the attitude of the second diffracting element 14 is automatically defined such that the optical axis of the second diffracting element 14 becomes substantially parallel to the optical axis Lu of the forward laser light Lf from the semiconductor laser 2 emergent through the light transmitting hole 203 shown in FIG. 3. Incidentally, after the disposed position of the second diffracting element 14 is finely adjusted in the widthwise direction of the package 20 in this state, the second diffracting element 14 is fixed by an adhesive agent or the like.

Outer Configuration of the Package

As shown in FIG. 3, four circular arc-shaped surfaces 40a, 40b, 40c, and 40d centering around the optical axis Lu of the forward laser light Lf emergent through the light transmitting hole 203 are formed on the outer surfaces of the projecting side walls 216 and 217 of the extended portion 219 of the package body 21. These circular arc-shaped surfaces 40a to 40d are respectively formed at angular portions of the projecting side walls 216 and 217, and have the same central angles. Of these circular arc-shaped surfaces 40a to 40d, the two circular arc-shaped surfaces 40a and 40c are axially symmetrical about the optical axis Lu, and the remaining two circular arc-shaped surfaces 40b and 40d are also axially symmetrical about the optical axis Lu. Front surfaces 41a and 41b of the front wall 212 of the package body 21 are flat reference planes perpendicular to the optical axis Lu.

Accordingly, when the light source unit 10 is mounted on the optical pickup device 1, if the reference planes 41a and 41b are used, the attitude of the light source unit 10 can be set such that the optical axis of such as the objective lens 12 and the optical axis Lu of the forward laser light Lf are aligned with each other.

In addition, if the reference planes 41a and 41b are used, the mounting of the light source unit 10 on the optical pickup device 1 can be facilitated. Meanwhile, rotational-angle adjustment between a sub-beam (laser light for tracking-error detection) and a track of the optical disk 4 for effecting tracking in accordance with a three-beam system can be easily effected by performing the rotational-angle adjustment of the light source unit 10 by making use of the circular arc-shaped surfaces 40a to 40d. Namely, the diffracting direction in the first diffracting element 13 can be set appropriately. Since the mutual relationship between the optical axis Lu of the forward laser light Lf emergent through the light transmitting hole 203 in the light source unit 10 and the optical axes of the first and second diffracting elements 13 and 14, as well as the diffraction characteristic (diffracting direction) of the first diffracting element 13, can thus be set appropriately, it is possible to realize an optical pickup device excelling in the optical characteristics. Further, since it is sufficient to fabricate the circular arc-shaped surfaces 40a to 40d centering around the optical axis Lu, an advantage is offered in that it is easy to fabricate the circular arc-shaped surfaces symmetric about the optical axis Lu, and it is easy to increase the surface accuracy of the circular arc-shaped surfaces. Still further, since the circular arc-shaped surfaces 40a to 40d are centered around the optical axis Lu, the light source unit rotates about the optical axis Lu during the rotational-angle adjustment. For this reason, the position of the optical axis Lu does not change in conjunction with the rotational-angle adjustment.

Basic Operation of the Optical Pickup Device

Next, referring to FIG. 1, a description will be given of the basic operation of the optical pickup device. In the light source unit 10, the forward laser light Lf emitted from the semiconductor laser 2 is made incident substantially perpendicularly upon the first diffracting element 13. A diffraction grating surface (not shown) is formed on the first diffracting element 13. This diffraction grating surface has the function of splitting the substantially perpendicularly incident forward laser light Lf into two sub-beams. In addition, the diffraction grating surface has the function of converting the wave surfaces of the two sub-beams so that the two sub-beams are focused at forward and backward positions in the optical disk 4 in the direction of the optical axis. This diffraction grating surface is formed at a position where the return light from the optical disk 4 does not pass again through the diffraction grating surface when it is incident again upon the first diffracting element 13.

For this reason, the forward laser light Lf is split into a main beam and the two sub-beams by this diffraction element 13. Of these beams, the main beam is used as the laser light for reproducing a signal (laser light for signal reproduction), while the two sub-beams are used as the laser light for detecting a tracking error (laser light for tracking-error detection).

The laser light for signal reproduction and the two beams of laser light for tracking-error detection reach the second diffracting element 14. The second diffracting element 14 is set such that the product of the zero-order diffraction efficiency on the optical path where these three beams of laser light reach the optical disk 4 and the first-order diffraction efficiency on the optical path leading from the optical disk 4 to the light-receiving element 3 for signal reproduction becomes maximum. A diffraction grating surface formed on the second diffracting element 14 is substantially parallel to the diffraction grating surface of the first diffracting element 13.

Of the three beams of laser light, the light component which passed through the second diffracting element 14

(zero-order diffracted light) is made emergent from the light source unit 10, is orthogonally bent by the upward-reflecting mirror 11, and is then focused on the recording surface of the optical disk 4 through the objective lens 12. At this time, the laser light for signal reproduction is focused on that recording surface, while the two beams of the laser light for tracking-error detection are respectively in a forward-focused state and in a backward-focused state.

The three beams of laser light focused on the recording surface of the optical disk 4 are reflected thereby and are converted to beams of the return light Lr which are directed from the optical disk 4 toward the light-receiving element 3 for signal reproduction. These beams of the return light Lr are made incident again upon the second diffracting element 14 of the light source unit 10 through the objective lens 12 and the upward-reflecting mirror 11.

Here, the second diffracting element 14 has only the function of diffracting the beams of the return light in a direction parallel to the substrate surface 111 of the semiconductor substrate 11, i.e., in the widthwise direction of the package 20 in this example, and does not have the function of effecting wavefront conversion such as the conversion and divergence of the respective beams of the return light Lr. For this reason, the three beams of the return light Lr incident upon the second diffracting element 14 are diffracted by the diffracting action of the diffracting element 14 and undergo a change in their advancing direction. That is, the respective beams of return light Lr are diffracted and separated from the forward laser light Lf from the laser light source 2A.

The light diffracted by the second diffracting element 14 is made incident upon the first diffracting element 13. As described before, the diffraction grating surface of the first diffracting element 13 is not formed in a range where these diffracted beams are made incident. For this reason, the respective diffracted beams incident upon the diffracting element 13 are passed through the first diffracting element 13 and reach the reflecting mirror 15. These diffracted beams are reflected perpendicularly downward to illuminate the light-receiving surfaces of the light-receiving element 3 for signal reproduction.

As shown in FIG. 7, the diffracted beams of the return light of the laser light for signal reproduction form light spots s1 and s2 on the light-receiving surface A. Meanwhile, the diffracted beams of the return light of the laser light for tracking-error detection form light spots s3 and s4 on the light-receiving surfaces B1, B2, and C. The other diffracted beams of the return light of the laser light for tracking-error detection form light spots s5 and s6 on the light-receiving surfaces D1, D2, and E.

In this example, the RF signal is detected on the amount of light received at the light-receiving surface A of the light-receiving element 3 for signal reproduction. The TE signal is detected by determining the difference between the total sum S1 of the amounts of light received at the light-receiving surfaces B1, B2, and C and the total sum S2 of the amounts of light received at the light-receiving surfaces D1, D2, and E. The FE signal is detected by determining the difference between the total sum S3 of the amounts of light received at the light-receiving surfaces B1, B2, and E and the total sum S4 of the amounts of light received at the light-receiving surfaces D1, D2, and C. It should be noted that these signals are generated by the controller (not shown) which is electrically connected to the leads 232 of the lead frame 23 of the light source unit 10.

As for the backward laser light Lb emergent from the back emergent end face 2b of the semiconductor laser 2, part of its light is directly incident upon the monitoring light-receiving element 25 formed on the upper surface of the submount 24. Feedback control of the laser light output of the semiconductor laser 2 is effected on the basis of the output signal of this monitoring light-receiving element 25. It should be noted that this feedback control is also performed by the aforementioned controller.

In the optical pickup device 1 of this example, the diffracting direction of the second diffracting element 14 is set in the widthwise direction of the package 20. For this reason, it is possible to prevent the light diffracted by the second diffracting element 14 from interfering with wires which connect the electrodes 111b of the semiconductor substrate 11 and the pad portions of the leads 232 of the lead frame 23. Accordingly, it is possible to accurately effect the reproduction of the optical disk 4 and tracking and focusing control. In addition, as compared with a case where the diffracting direction of the second diffracting element 14 is set in the vertical direction of the package 20, the thickness of the light source unit 10 can be made small.

Here, in the optical pickup device 1 of this example, the second diffracting element 14 has only the function of diffracting the beams of the return light from the optical disk 4 and does not have the function of effecting wavefront conversion. For this reason, the optical path length from the semiconductor laser 2 to the second diffracting element 14 and the optical path length from the second diffracting element 14 to the light-receiving element 3 for signal reproduction are equal. Hence, the optical path length of the return light can be made shorter than in the conventional arrangement, and the optical system of the optical pickup device can be made compact. As a result, the device can be made compact.

Specifically, since the second diffracting element 14 has the function of diffracting the return light and does not have the function of effecting wavefront conversion, the converging point of light diffracted by the diffracting element 14 is optically conjugate with a virtual light-emitting point of the two beams of laser light for tracking-error detection generated by being split by the first diffracting element 13. Accordingly, the relationship which is described below holds for the light-emitting point of the forward laser light Lf of the semiconductor laser 2 and the center of the light-receiving element 3 for signal reproduction.

Figure 15:
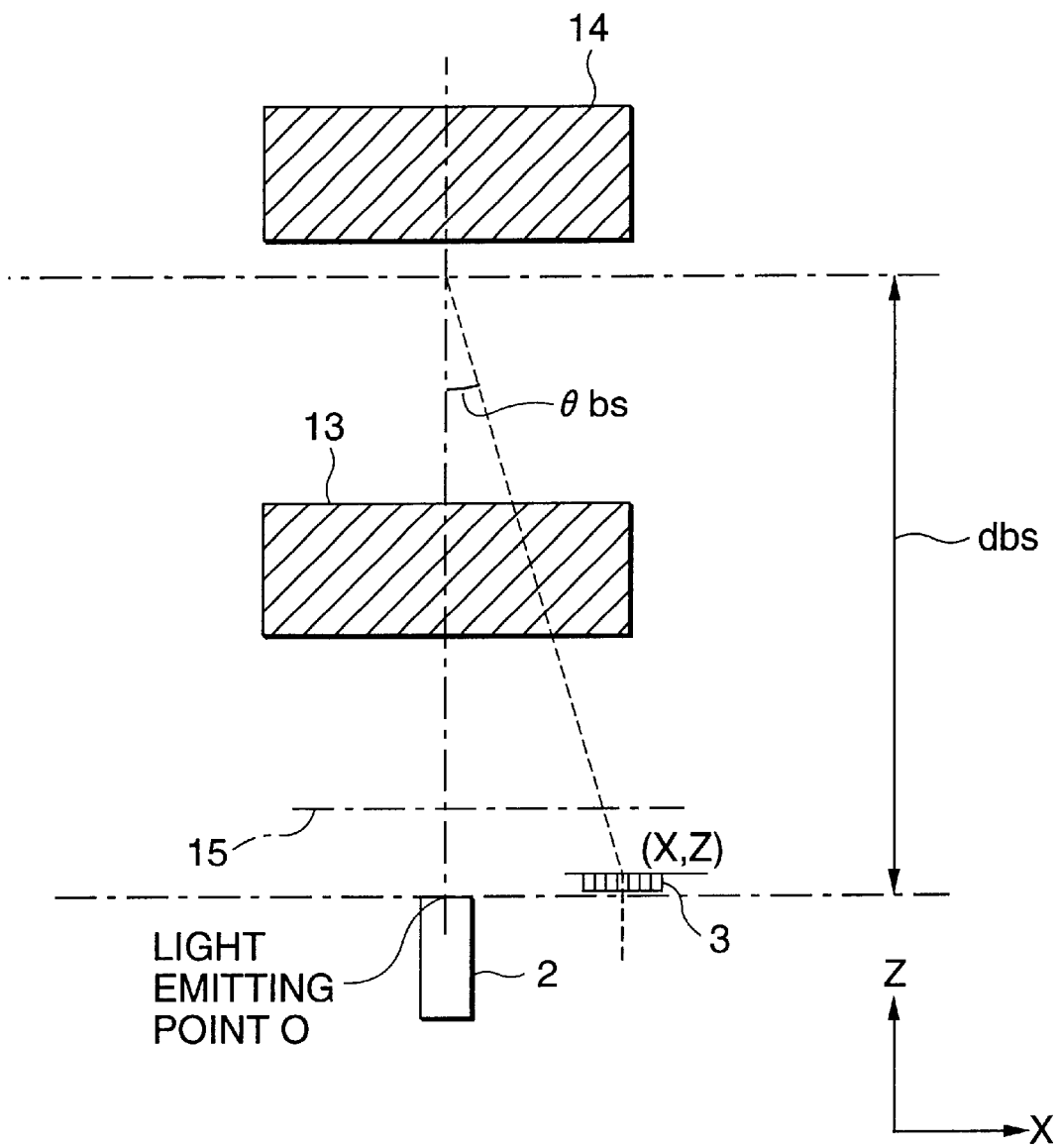
FIG. 15 is a diagram for explaining a widthwise position for forming the package of the light-receiving element for signal reproduction in the light source unit of the optical pickup device.
Figure 16:
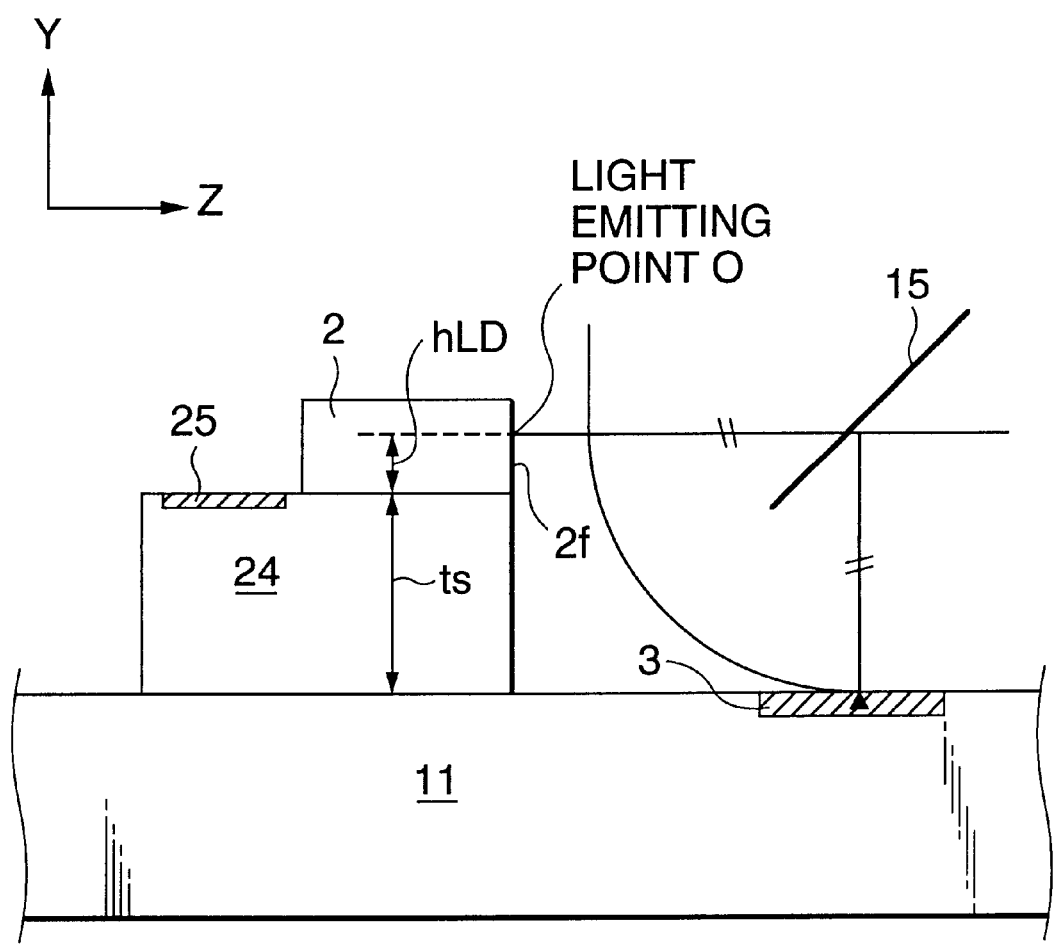
FIG. 16 is a diagram for explaining a position in the back-and-forth direction for forming the package of the light-receiving element for signal reproduction in the light source unit of the optical pickup device.

As shown in FIGS. 15 and 16, it is assumed that the thickness of the submount 24, the height from the surface of contact between the submount 24 and the semiconductor laser 2 to the light-emitting point O, the angle of optical path separation in the second diffracting element 14 at the wavelength of the semiconductor laser 2, and the optical distance from the semiconductor laser 2 to the diffraction grating surface of the second diffracting element 14 along the optical path Lu of the laser light Lf are respectively set to ts, hLD, qbs, and dbs. Then, X and Y coordinates of the center of the light-receiving element 3 for signal reproduction if the light-emitting point O in the (X, Z) plane where the light-receiving element 3 for signal reproduction is formed is set as the origin can be expressed by the following Formulae (1) and (2):

$$X = dbs \times \sin(qbs) \tag{1}$$

$$Z = dbs \times \{1 - \cos(qbs)\} + ts + hLD \tag{2}$$

It should be noted that, as can be seen from FIG. 15, the optical distance from the semiconductor laser 2 to the diffraction grating surface of the second diffracting element 14 along the optical path Lu of the forward laser light Lf corresponds to the distance between the semiconductor laser 2 and a position slightly shifted from the light incident surface of the second diffracting element 14 toward the semiconductor laser 2. In addition, FIGS. 15 and 16 show a case in which the reflecting angle of the reflecting mirror 15 is set to 45 degrees, and an offset of the reflecting angle of the mirror 15 and its angular offset about the optical axis are not taken into account.

In the optical pickup device 1 of this example, the focus error signal concerning the objective lens 12 is generated by using the laser light for tracking-error detection, and a diffracting element having only the simple function of optical path separation is adopted as the second diffracting element 14 for diffracting and separating the return light from the optical disk 4. For this reason, the diffraction pattern of the diffracting element 14 can be simplified. For example, it is possible to adopt a linear diffraction pattern. The diffracting element having such a diffraction pattern is relatively stable with respect to factors deteriorating the diffraction characteristics, such as fluctuations in the wavelength and deviations in the mounting positions of the optical elements. Accordingly, it is possible to stably obtain targeted optical characteristics. In addition, since it suffices if a simplified diffraction pattern is formed, it is possible to provide a large allowance for the error in the formation of the diffraction pattern, and the cost of fabrication of the diffracting element can be reduced.

Other Embodiments

Although, in the optical pickup device 1, the shielding projection 60 is formed integrally on the package cover plate 22, the shielding projection 60 may be formed by separately mounting a shielding member on the package cover plate 22. In addition, an arrangement may be provided such that a shielding member is mounted on the substrate surface 111 of the semiconductor substrate 11.

In addition, although, in the optical pickup device 1, the individual independent first and second diffracting elements 13 and 14 are used, it goes without saying that it is possible to adopt a single optical element which has the optical characteristics of the first diffracting element 13 on one surface thereof and has the optical characteristics of the second diffracting element 14 on another surface thereof.

Further, although the arrangement provided is such that the submount 24 is mounted on the substrate surface 111 of the semiconductor substrate 11, an arrangement may be provided such that the submount 24 is mounted on the stage 231 or the leads 232 of the lead frame 23.

Still further, the optical system of the optical pickup device 1 may include not only the optical elements shown in FIG. 1 but also a lens for converting the laser light Lf into a parallel bundle of rays, a beam shaping prism for shaping the diameters of the beam diameters of the laser light in two perpendicular directions, and opening-limiting means and a wavelength-selective optical element for reading information on the optical disks having different specifications.

As described above, in accordance with the present invention, it becomes possible to improve the accuracy of the return light from the optical disk which is incident upon the light-receiving element for signal reproduction, and stabilize the tracking and focus controlling operation of the focusing means, thereby making it possible to accurately effect reproduction and recording of the optical disk and tracking and focusing control of the focusing means.

What is claimed is:

1. An optical pickup device comprising:

a semiconductor laser for emitting forward and backward laser light from front and back emergent end faces thereof;

focusing means for focusing the forward laser light emergent from the front emergent end face of said semiconductor laser onto an optical recording medium;

a light-receiving element for signal reproduction for detecting return light from the optical recording medium, and a light-guiding system for guiding the return light to said light-receiving element for signal reproduction, said optical pickup device being provided with a light source unit having an arrangement in which said semiconductor laser and said light-receiving element for signal reproduction being incorporated in a common package; and shielding means, disposed inside said package of said light source unit, for preventing the light emitted from said semiconductor laser from being incident upon said light-receiving element for signal reproduction, wherein said shielding means is a shielding projection disposed between said semiconductor laser and said light-receiving element for signal reproduction.

2. The optical pickup device according to claim 1, wherein said light-guiding system has a reflecting mirror for guiding the return light to said light-receiving element for signal reproduction, wherein said light-receiving element for signal reproduction is disposed at a position for avoiding an optical axis of the forward laser light on an emergent-direction side of the forward laser light with respect to the front emergent end face of said semiconductor laser, and wherein a mounting portion for mounting said reflecting mirror is formed on an inner surface portion of said package opposing a light-receiving surface of said light-receiving element for signal reproduction, and said mounting portion extends to a position located beyond the back emergent end face along the emergent direction of the backward laser light in a state in which said mounting portion projects toward said light-receiving surface.

3. The optical pickup device according to claim 2, wherein said mounting portion and said shielding wall are formed integrally.

4. The optical pickup device according to claim 1, wherein an inner surface of said package opposing the back emergent end face of said semiconductor laser is inclined with respect to a direction perpendicular to an optical axis of the backward laser light.

5. The optical pickup device according to claim 1, wherein said light source unit has separating means for separating the forward laser light emitted from said semiconductor laser into laser light for signal reproduction and laser light for tracking-error detection, and detection of a focusing error of said focusing means is effected by using the laser light for tracking-error detection.

* * * * *